(12) United States Patent
Peters et al.

(10) Patent No.: US 10,885,051 B1
(45) Date of Patent: *Jan. 5, 2021

(54) AUTOMATIC DATA WAREHOUSE GENERATION USING AUTOMATICALLY GENERATED SCHEMA

(71) Applicant: Infor(US), Inc., New York, NY (US)

(72) Inventors: Bradley S. Peters, San Francisco, CA (US); Paul H. Staelin, Orinda, CA (US); Stefan M. Schmitz, San Francisco, CA (US)

(73) Assignee: Infor (US), Inc., New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/265,780

(22) Filed: Sep. 14, 2016

Related U.S. Application Data

(63) Continuation of application No. 12/381,315, filed on Mar. 9, 2009, now Pat. No. 9,483,537.

(60) Provisional application No. 61/068,531, filed on Mar. 7, 2008.

(51) Int. Cl.
| | | |
|---|---|---|
| *G06F 16/00* | (2019.01) | |
| *G06F 16/25* | (2019.01) | |
| *G06F 16/21* | (2019.01) | |
| *G06F 16/28* | (2019.01) | |
| *G06F 16/2455* | (2019.01) | |

(52) U.S. Cl.
CPC .......... *G06F 16/254* (2019.01); *G06F 16/212* (2019.01); *G06F 16/2456* (2019.01); *G06F 16/283* (2019.01)

(58) Field of Classification Search
CPC combination set(s) only.
See application file for complete search history.

(56) References Cited

U.S. PATENT DOCUMENTS

| | | |
|---|---|---|
| 4,378,917 A | 4/1983 | Negishi |
| 4,547,670 A | 10/1985 | Sugimoto |
| 4,556,946 A | 12/1985 | Taniguti |
| 4,570,100 A | 2/1986 | Sato |
| 4,632,536 A | 12/1986 | Sonobe |
| 4,784,904 A | 11/1988 | Wood |
| 4,883,441 A | 11/1989 | Byer |
| 4,901,266 A | 2/1990 | Takagi |
| 4,923,473 A | 5/1990 | Griss |
| 4,931,743 A | 6/1990 | Fukuda |
| 5,025,121 A | 6/1991 | Allen |
| 5,284,202 A | 2/1994 | Dickey |
| 5,294,956 A | 3/1994 | Earle |
| 5,333,865 A | 8/1994 | Holmes |
| 5,418,728 A | 5/1995 | Yada |

(Continued)

OTHER PUBLICATIONS

Rakesh, Agrawal, et al., 'Modeling Multidimensional databases,' Apr. 7-11, 1997, IEEE Proceedings of the 13th International Conference on Data Engineering, pp. 232-243.

(Continued)

*Primary Examiner* — Farhan M Syed
(74) *Attorney, Agent, or Firm* — Blank Rome LLP

(57) ABSTRACT

Techniques for automatic data warehouse generation are disclosed herein. A first data set is received. The first data set includes a plurality of tables and includes a plurality of keys. A dimensional model is mapped onto the first data set. A schema is automatically generated based on the dimensional model.

17 Claims, 15 Drawing Sheets

(56) References Cited

U.S. PATENT DOCUMENTS

| | | |
|---|---|---|
| 5,439,920 A | 8/1995 | Laurent |
| 5,463,235 A | 10/1995 | Ishii |
| 5,502,798 A | 3/1996 | Ito |
| 5,812,567 A | 9/1998 | Jeon |
| 5,878,410 A * | 3/1999 | Zbikowski ........ G06F 17/30625 |
| 5,940,119 A | 8/1999 | Platte |
| 6,015,021 A | 1/2000 | Tanaka |
| 6,026,368 A * | 2/2000 | Brown ................... G06Q 30/02 705/14.56 |
| 6,050,830 A | 4/2000 | Tanaka |
| 6,108,689 A * | 8/2000 | Fagen ..................... G06F 9/544 709/206 |
| 6,154,766 A | 11/2000 | Yost |
| 6,178,458 B1 | 1/2001 | Wang |
| 6,353,834 B1 * | 3/2002 | Wong ................. G06F 11/1471 707/799 |
| 6,365,239 B1 | 4/2002 | Kubota |
| 6,368,680 B1 | 4/2002 | Kubota |
| 6,411,961 B1 * | 6/2002 | Chen ....................... G06F 16/30 |
| 6,601,041 B1 * | 7/2003 | Brown ................... G06Q 30/02 705/14.61 |
| 6,615,253 B1 * | 9/2003 | Bowman-Amuah ....................... G06F 17/30902 707/999.1 |
| 6,691,100 B1 * | 2/2004 | Alavi ..................... G06F 16/34 |
| 6,754,842 B2 * | 6/2004 | Kettley .............. G06F 11/1471 707/999.202 |
| 6,801,910 B1 | 10/2004 | Bedell et al. |
| 7,143,107 B1 | 11/2006 | Nebres, Jr. |
| 7,174,349 B1 * | 2/2007 | Alavi ..................... G06F 16/34 |
| 7,523,344 B2 * | 4/2009 | Qiao ..................... G06F 11/203 714/15 |
| 7,546,284 B1 * | 6/2009 | Martinez ........... G06F 17/30336 |
| 7,672,737 B2 * | 3/2010 | Hood ................. G05B 19/4188 700/1 |
| 7,672,950 B2 * | 3/2010 | Eckardt, III ........ G06F 16/3323 707/999.01 |
| 8,140,376 B2 | 3/2012 | Koonce |
| 8,417,558 B2 | 4/2013 | Koonce |
| 8,527,324 B2 | 9/2013 | Richter |
| 8,645,313 B1 | 2/2014 | Li et al. |
| 9,183,317 B1 | 11/2015 | Cappiello et al. |
| 2002/0049776 A1 * | 4/2002 | Aronoff ............ G06F 17/30174 |
| 2002/0116389 A1 * | 8/2002 | Chen .................. G06Q 30/0201 |
| 2002/0156761 A1 | 10/2002 | Chen |
| 2003/0033349 A1 * | 2/2003 | Lambert ................. G06F 9/546 709/201 |
| 2003/0187741 A1 * | 10/2003 | Brown ................... G06Q 30/02 705/14.58 |
| 2003/0212691 A1 * | 11/2003 | Kuntala ................. G06N 20/00 |
| 2004/0100900 A1 * | 5/2004 | Lines ................. G06F 13/4247 370/229 |
| 2004/0215626 A1 * | 10/2004 | Colossi ............. G06F 16/24542 |
| 2004/0215998 A1 * | 10/2004 | Buxton ............... G06F 11/1474 714/2 |
| 2006/0028695 A1 * | 2/2006 | Knighton ................ G06F 30/00 358/474 |
| 2006/0106847 A1 * | 5/2006 | Eckardt, III ........ G06F 16/3323 |
| 2006/0122882 A1 * | 6/2006 | Brown ................... G06Q 30/02 705/14.42 |
| 2006/0177004 A1 | 8/2006 | Gilbert |
| 2006/0259154 A1 * | 11/2006 | Hood ..................... G06Q 10/06 700/2 |
| 2007/0078849 A1 | 4/2007 | Slothouber |
| 2007/0180150 A1 * | 8/2007 | Eisner ..................... G06F 9/546 709/246 |
| 2007/0239742 A1 * | 10/2007 | Saha .................... G06F 16/9024 |
| 2007/0282864 A1 * | 12/2007 | Parees ................... G06Q 10/06 |
| 2008/0027966 A1 * | 1/2008 | Parees .................. G06F 16/211 |
| 2008/0091517 A1 | 4/2008 | Koonce |
| 2008/0162487 A1 | 7/2008 | Richter |
| 2008/0222652 A1 * | 9/2008 | Lambert ................. G06F 9/546 719/315 |
| 2008/0270369 A1 | 10/2008 | Myerson |
| 2009/0138339 A1 | 5/2009 | Moukas |
| 2010/0106752 A1 * | 4/2010 | Eckardt, III .......... G06F 16/338 707/805 |
| 2011/0061014 A1 | 3/2011 | Frader-Thompson |
| 2012/0179534 A1 | 7/2012 | Moukas |
| 2013/0013393 A1 | 1/2013 | Koonce |
| 2013/0268350 A1 | 10/2013 | Koonce |

OTHER PUBLICATIONS

Roger Lewis, MD, PhD, 'An Introduction to Classification and Regression Tree (CART) Analysis', 2000, Annual Meeting of the Society for Academic Emergency Medicine, pp. 1-14.

* cited by examiner

| Product ID | Category ID | Product Name | Category Name | Unit Price |
|---|---|---|---|---|
| 1 | 3 | Apple | Fruit | $0.79 |
| 2 | 1 | Tomato | Vegetable | $0.43 |
| 3 | 3 | Banana | Fruit | $1.23 |
| 4 | 4 | Pine nuts | Nuts | $2.67 |
| 5 | 3 | Orange | Fruit | $0.37 |
| 6 | 1 | Potato | Vegetable | $0.28 |
| 7 | 4 | Almonds | Nuts | $1.28 |
| 8 | 3 | Kiwi | Fruit | $0.98 |
| 9 | 4 | Peanuts | Nuts | $1.67 |
| 10 | 4 | Cashews | Nuts | $2.98 |
| 11 | 2 | Pork | Meat | $4.23 |
| 12 | 2 | Beef | Meat | $5.78 |
| 13 | 1 | Carrot | Vegetable | $0.34 |
| 14 | 3 | Pear | Fruit | $0.67 |
| 15 | 3 | Grapefruit | Fruit | $0.56 |
| 16 | 3 | Grapes | Fruit | $1.26 |
| 17 | 1 | Mushroom | Vegetable | $2.39 |
| 18 | 2 | Chicken | Meat | $2.91 |
| 19 | 2 | Turkey | Meat | $2.67 |
| 20 | 1 | Cabage | Vegetable | $1.32 |

FIG. 5

| Loyalty Card ID | Age Group | Gender |
|---|---|---|
| 1 | 45-54 | Female |
| 2 | 35-44 | Female |
| 3 | 35-44 | Female |
| 4 | Over 64 | Male |
| 5 | 25-34 | Male |
| 6 | Over 64 | Female |
| 7 | 35-44 | Female |
| 8 | 35-44 | Female |
| 9 | 45-54 | Female |
| 10 | 55-64 | Male |
| 11 | 25-34 | Male |
| 12 | 25-34 | Male |
| 13 | 18-24 | Female |
| 14 | 25-34 | Female |
| 15 | 45-54 | Female |
| 16 | 35-44 | Male |
| 17 | 45-54 | Female |
| 18 | 45-54 | Male |
| 19 | 18-24 | Male |
| 20 | Over 64 | Female |
| 21 | 25-34 | Female |
| 22 | Under 18 | Male |
| 23 | 25-34 | Male |
| 24 | 25-34 | Female |
| 25 | Under 18 | Male |

FIG. 6

| Store ID | Region | City | Type |
|---|---|---|---|
| 1 | EAST | New York | Convenience |
| 2 | EAST | New York | Convenience |
| 3 | NORTH | Cleveland | Mega |
| 4 | NORTH | Cleveland | Super |
| 5 | WEST | Los Angeles | Mega |
| 6 | EAST | Washington D.C. | Super |
| 7 | EAST | New York | Mega |
| 8 | EAST | Boston | Mega |
| 9 | EAST | Boston | Convenience |
| 10 | WEST | San Francisco | Super |
| 11 | WEST | San Francisco | Super |
| 12 | NORTH | Chicago | Convenience |
| 13 | EAST | Boston | Super |
| 14 | EAST | Washington D.C. | Mega |
| 15 | EAST | New York | Mega |
| 16 | SOUTH | Miami | Super |
| 17 | EAST | New York | Convenience |
| 18 | EAST | New York | Convenience |
| 19 | WEST | San Francisco | Convenience |
| 20 | SOUTH | New Orleans | Super |
| 21 | SOUTH | Miami | Convenience |
| 22 | EAST | Washington D.C. | Mega |
| 23 | NORTH | Cleveland | Mega |
| 24 | EAST | Washington D.C. | Super |
| 25 | WEST | San Francisco | Convenience |

FIG. 7

| Cart ID | Store ID | Loyalty Card ID | Sales Date |
|---|---|---|---|
| 1 | 60 | 41 | 29-Oct-07 |
| 2 | 72 | 29 | 28-Jun-07 |
| 3 | 14 | 87 | 30-Oct-07 |
| 4 | 30 | 71 | 30-Jan-07 |
| 5 | 2 | 99 | 5-Aug-07 |
| 6 | 71 | 30 | 28-Nov-07 |
| 7 | 53 | 48 | 8-Apr-07 |
| 8 | 66 | 35 | 8-Jul-07 |
| 9 | 59 | 42 | 10-Jan-07 |
| 10 | 55 | 46 | 18-Jul-07 |
| 11 | 74 | 27 | 26-Jul-07 |
| 12 | 55 | 46 | 24-Jun-07 |
| 13 | 83 | 18 | 23-Jul-07 |
| 14 | 17 | 84 | 4-Jul-07 |
| 15 | 92 | 9 | 23-Sep-07 |
| 16 | 68 | 33 | 11-Jul-07 |
| 17 | 91 | 10 | 6-Dec-07 |
| 18 | 95 | 6 | 12-Jan-07 |
| 19 | 6 | 95 | 29-Aug-07 |
| 20 | 83 | 18 | 7-May-07 |
| 21 | 16 | 85 | 19-Nov-07 |
| 22 | 85 | 16 | 26-Jul-07 |
| 23 | 5 | 96 | 14-Mar-07 |
| 24 | 95 | 6 | 31-Mar-07 |
| 25 | 27 | 74 | 27-Nov-07 |

FIG. 8

| Cart ID | Product ID | Quantity |
|---|---|---|
| 1 | 2 | 1 |
| 1 | 17 | 3 |
| 1 | 20 | 3 |
| 2 | 2 | 4 |
| 2 | 5 | 1 |
| 2 | 11 | 2 |
| 3 | 7 | 4 |
| 3 | 8 | 2 |
| 3 | 12 | 2 |
| 3 | 13 | 3 |
| 3 | 16 | 4 |
| 4 | 7 | 2 |
| 5 | 19 | 4 |
| 5 | 20 | 5 |
| 6 | 3 | 5 |
| 6 | 6 | 3 |
| 6 | 9 | 2 |
| 6 | 13 | 3 |
| 6 | 15 | 2 |
| 6 | 19 | 2 |
| 7 | 5 | 2 |
| 7 | 14 | 1 |
| 7 | 20 | 5 |
| 8 | 5 | 3 |

| File | Process | Status | Last Upload Date | # Columns | # Rows | Size (kb) | Actions |
|---|---|---|---|---|---|---|---|
| Cart Details | ☑ | ⦿ | Jul 10, 2008 | 3 | 12,440 | 128.2 | |
| Customers | ☑ | ⦿ | Jul 10, 2008 | 3 | 102 | 1.7 | |
| Products | ☑ | ⦿ | Jul 10, 2008 | 5 | 22 | 0.5 | |
| Shopping Carts | ☑ | ⦿ | Jul 10, 2008 | 4 | 3,002 | 62.0 | |
| Stores | ☑ | ⦿ | Jul 10, 2008 | 4 | 102 | 2.7 | |

My Data Sources — 1002

Add a New Data Source or Upload an Existing Source

FIG. 10B

Edit Hierarchies

Defined Hierarchies    Add New Hierarchy

- Sale
  - Product Sale

Level Key Columns: ☑ Cart ID   ☑ Product ID   ☐ Quantity

Rename | Remove | Add Above | Add Below

FIG. 10C

Edit Hierarchies

Defined Hierarchies    Add New Hierarchy

- Sales
  - Cart
    - Product Sale
- Customers
  - Customer
- Products
  - Category
    - Product
- Stores
  - Store Rename | Remove | Add Above | Add Below

| Data Source | Column | Hierarchy | Level | Measure | Analyze by Date |
|---|---|---|---|---|---|
| Cart Details | Cart ID | Sales | <blank> | FALSE | FALSE |
| Cart Details | Product ID | Sales | <blank> | FALSE | FALSE |
| Cart Details | Quantity | Sales | <blank> | TRUE | FALSE |
| Customers | Loyalty Card ID | Customers | <blank> | TRUE | FALSE |
| Customers | Age Group | Customers | <blank> | FALSE | FALSE |
| Customers | Gender | Customers | <blank> | FALSE | FALSE |
| Products | Product ID | Products | Product | TRUE | FALSE |
| Products | Category ID | Products | Category | TRUE | FALSE |
| Products | Product Name | Products | Product | FALSE | FALSE |
| Products | Category Name | Products | Category | FALSE | FALSE |
| Products | Unit Price | Products | Product | TRUE | FALSE |
| Shopping Carts | Cart ID | Sales | Cart | TRUE | FALSE |
| Shopping Carts | Store ID | <blank> | <blank> | FALSE | FALSE |
| Shopping Carts | Loyalty Card ID | <blank> | <blank> | FALSE | FALSE |
| Shopping Carts | Sales Date | Sales | Cart | FALSE | TRUE |
| Stores | Store ID | Stores | <blank> | TRUE | FALSE |
| Stores | Region | Stores | <blank> | FALSE | FALSE |
| Stores | City | Stores | <blank> | FALSE | FALSE |
| Stores | Type | Stores | <blank> | FALSE | FALSE |

FIG. 12

| # Times Data Has Been Processed: | 1 |
| Date to use for processing: | January 26, 2009 |
| Re-Create Overview QuickDashboards™: | ☐ |

Recent processing history:

| Number | Date Used | Result | |
|---|---|---|---|
| 1 | 01/26/2009 | Complete | detail |

View Processed Data

[Done] [Process]

FIG. 13

| | |
|---|---|
| Category Name | Sum: Quantity |
| Fruit | 37,431 |
| Meat | 21,271 |
| Nuts | 21,056 |
| Vegetable | 26,166 |

| | | |
|---|---|---|
| Category Name | Year/Month | Sum: Quantity |
| Fruit | 2008/7 | 37,431 |
| Vegetable | 2008/7 | 26,166 |
| Nuts | 2008/7 | 21,056 |
| Meat | 2008/7 | 21,271 |

|  | 2007/1 | 2007/2 | 2007/3 |
|---|---|---|---|
| Fruit | 3,382 | 3,019 | 2,939 |
| Meat | 1,[Report] | 1,938 | 1,513 |
| Nuts | 1,778 | 1,699 | 1,713 |
| Vegetable | 2,490 | 1,969 | 1,964 |
|  | 2007/4 | 2007/5 | 2007/6 |
| Fruit | 2,240 | 3,059 | 3,412 |
| Meat | 1,155 | 1,720 | 1,969 |
| Nuts | 1,207 | 1,545 | 2,080 |
| Vegetable | 1,576 | 2,201 | 2,340 |

US 10,885,051 B1

AUTOMATIC DATA WAREHOUSE GENERATION USING AUTOMATICALLY GENERATED SCHEMA

CROSS REFERENCE TO OTHER APPLICATIONS

This application is a continuation of co-pending U.S. patent application Ser. No. 12/381,315, entitled AUTOMATIC DATA WAREHOUSE GENERATION USING AUTOMATICALLY GENERATED SCHEMA filed Mar. 9, 2009 which is incorporated herein by reference for all purposes, which claims priority to U.S. Provisional Patent Application No. 61/068,531 entitled AUTOMATIC DATA WAREHOUSE GENERATION filed Mar. 7, 2008 which is incorporated herein by reference for all purposes.

BACKGROUND OF THE INVENTION

The design and creation of a data warehouse is traditionally a highly manual process. Typically, the dimensional model and database schema of the data warehouse is specified and created manually based on an understanding of the business requirements and, in general, independent from the source data. Unfortunately, designing a dimensional model and then mapping source data files to the corresponding database schema is a difficult and time-consuming process. Moreover, additional manual work is typically required to maintain that schema and the data it contains as new data is continually loaded into it.

BRIEF DESCRIPTION OF THE DRAWINGS

Various embodiments of the invention are disclosed in the following detailed description and the accompanying drawings.

FIG. 5 illustrates an example of a table that identifies twenty products grouped into four product categories.

FIG. 6 illustrates an example of a portion of a table that identifies 100 customers, including age and gender information.

FIG. 7 illustrates an example of a portion of a table that identifies 100 grocery stores of three times across twelve cities.

FIG. 8 illustrates an example of a portion of a table that identifies 3,000 shopping baskets.

FIG. 9 illustrates an example of a portion line item details for the shopping baskets.

FIG. 10A illustrates an example of an interface.
FIG. 10B illustrates an example of an interface.
FIG. 10C illustrates an example of an interface.
FIG. 12 illustrates an example of a list of column properties.
FIG. 13 illustrates an example of an interface.

DETAILED DESCRIPTION

Figure 1:
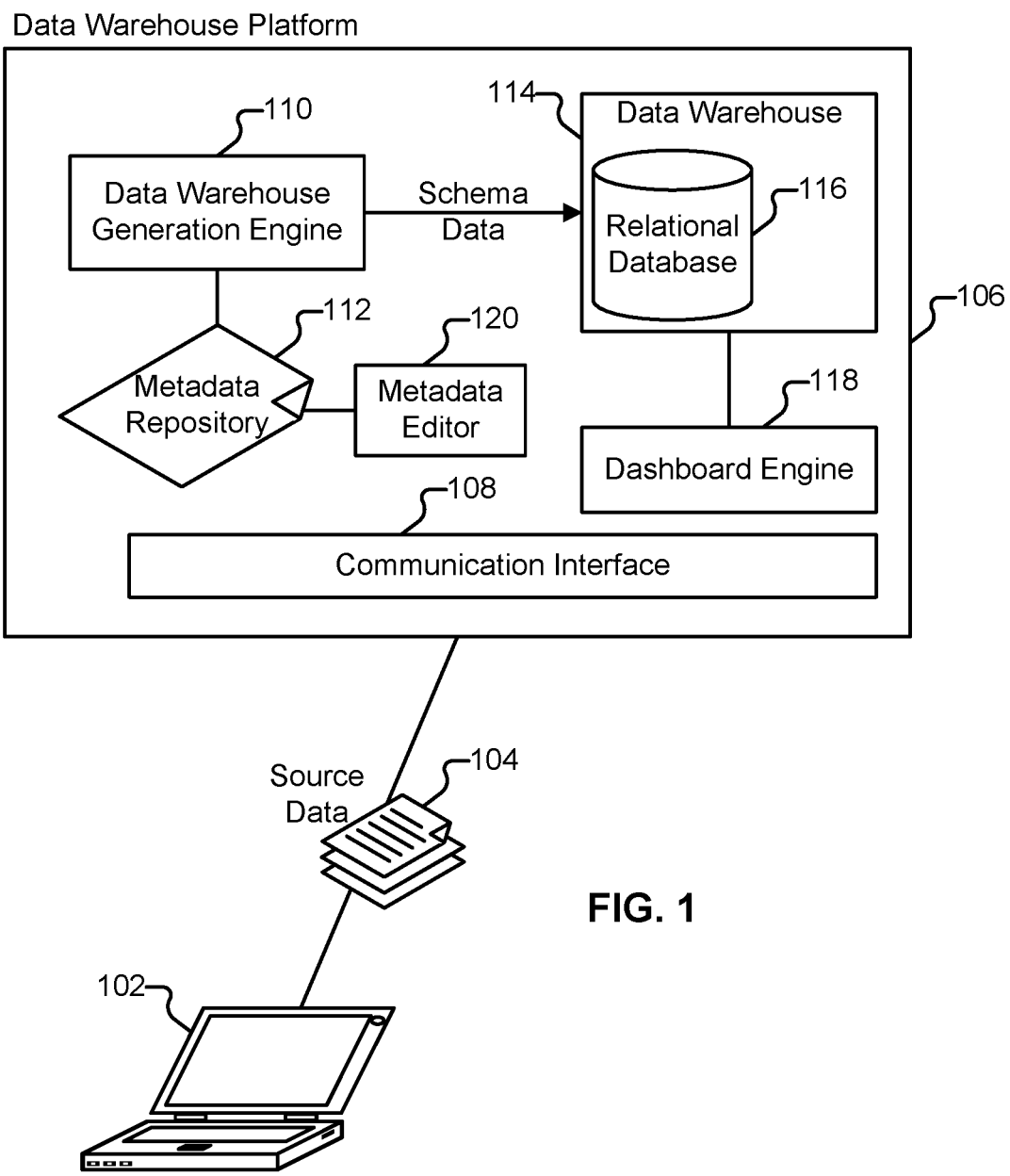
FIG. 1 illustrates an example of an environment in which data warehouse generation is performed.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Techniques for automatically generating a database schema (e.g., for a relational database) and data loading procedures for a data warehouse using metadata derived from source data files are described herein. A data warehouse is a repository of all or significant portions of data collected by entities such as the various business systems of an enterprise. With a data warehouse, business data captured from diverse sources can be used for subsequent analysis and access, e.g., by business users.

Typically, analysis of such data requires the ability to look at that data at multiple levels. Analysis is also comparative, and requires the ability to look at various measures for different parts of a business to compare them vs. each other and over time. This process of hierarchical measurement and comparison naturally leads to a "dimensional model." The dimensional metaphor provides a way of describing various hierarchical measurements. In the dimensional model, two concepts include measures and dimensions. Measures are measurements of data such as business data. Examples of measures include revenue, sales, assets, number of orders, etc. Measures can be analyzed across dimensions. Dimensions are ways of grouping measurements. Examples of dimensions include years, months, product categories, sales regions, etc. One example of information that can be expressed using a dimensional is the monthly sales by product.

A database schema defines the structure of a database system, described in a formal language supported by a database management system (DBMS). In a relational database, the schema defines the tables, the fields in each table, and the relationships between fields and tables.

A star schema is an example of the database schema for a dimensional model. In the star schema design, a single object (the fact table) sits in the middle and is connected to other surrounding objects (dimension tables). A star schema can be simple or complex. A simple star might include as little as one fact table; a more complex star has multiple fact tables. The star schema (also referred to as a star join schema) is an example of a data warehouse schema, and includes fact tables referencing any number of dimension tables. The "facts" that the data warehouse helps analyze are classified along different "dimensions." The fact tables typically hold the main data, measures, while the dimension tables describe each value of a dimension and can be joined to fact tables as needed.

FIG. 1 illustrates an example of an environment in which data warehouse generation is performed. In the example shown, system 106 receives source data 104, such as from client 102. In various embodiments, client 102 sends source data 104 files directly to system 106, e.g. by uploading source data 104 via a graphical or other interface. Client 102 can also provide a pointer to where the data can be found, such as a URL and could also use a third party service to provide the source data to system 106.

As described in more detail below, data warehouse generation engine 110 reads the received source data files, reads metadata stored in metadata repository 112, and automatically generates a set of schema and data loading procedures. Also as described in more detail below, dashboard engine 118 is configured to automatically evaluate the source data (and/or data in data warehouse 114) and to generate applicable reports.

Examples of different types of source data files 102 include flat files, Excel spreadsheets, tables in a relational database, structured data files such as XML data, and data obtained via a service call to another program (for example a web service or a remote procedure call). In the case of flat files, fields from each record may have fixed width with padding, or may be delimited by whitespace, tabs, commas or other characters. Source data may originate from a set of operational data stores, back office systems or existing data warehouses/marts.

Metadata in repository 110 is implemented using the Extensible Markup Language (XML) and can also make use of any other suitable language. In some embodiments, the metadata for the data warehouse schema and data loading procedures is editable using Metadata Management Tool 120. Augmentations include but are not limited to adding column and table transformations.

Data Warehouse 114, which is implemented in this example by a relational database 116, is organized around dimensions and measures (or facts). The relational database is a collection of data items organized as a set of tables with each table organized into columns and rows. The schema of data warehouse 114 comprises staging tables mapped to source data files, dimension and measure tables mapped to staging tables, and join relationships between dimension and dimension or measure tables. In various embodiments it also contains information about the granularity of data, how data may be partitioned for performance purposes, and/or how that data may be indexed by the underlying relational database for performance purposes.

The creation and population of the relational database 116, based on the data warehouse schema defined in repository 112 may be performed in any suitable manner, as applicable. For example, in one embodiment, data warehouse generation engine 110 interprets the logical dimensional structure in repository 112, automatically initializes corresponding relational database 116, and loads data from source data 104 into database 116 using data loading procedures in repository 112, by calling one or more APIs (e.g. in the SQL language).

As described in more detail below, using editing tool 120, a user is able to declare the grain of a source data file and label each source data element as pertaining to a logical dimension and/or as a measure. Key columns are mapped by the user to their corresponding levels in the dimensional hierarchies. For example, a user may map the key column "Region ID" in a "Business" dimension to a "Region" level in an associated "Business" hierarchy. The corresponding data warehouse star, including staging, measure, and dimension tables and joins, as well as loading procedures from source files to staging and staging to warehouse tables are then generated automatically. Metadata repository 112 stores all the metadata that defines the star schema, mapping and transformations of source data files to staging tables, and staging tables to measures and dimension tables. Also as described in more detail below, in some embodiments system 106 automatically performs portions of this processing, reducing and in some cases eliminating the need for a user to perform such tasks.

In various embodiments, the infrastructure provided by portions of system 106 is located on and/or replicated across a plurality of servers rather than the entirety of system 106 being collocated on a single platform. Such may be the case, for example, if the contents of database 116 are vast (and thus distributed across multiple databases) and/or if system 106 is used to provide services to many users. Whenever system 106 performs a task (such as receiving information from a user, producing reports, etc.), either a single component or a subset of components or all components of system 106 may cooperate to perform the task.

Figure 2:
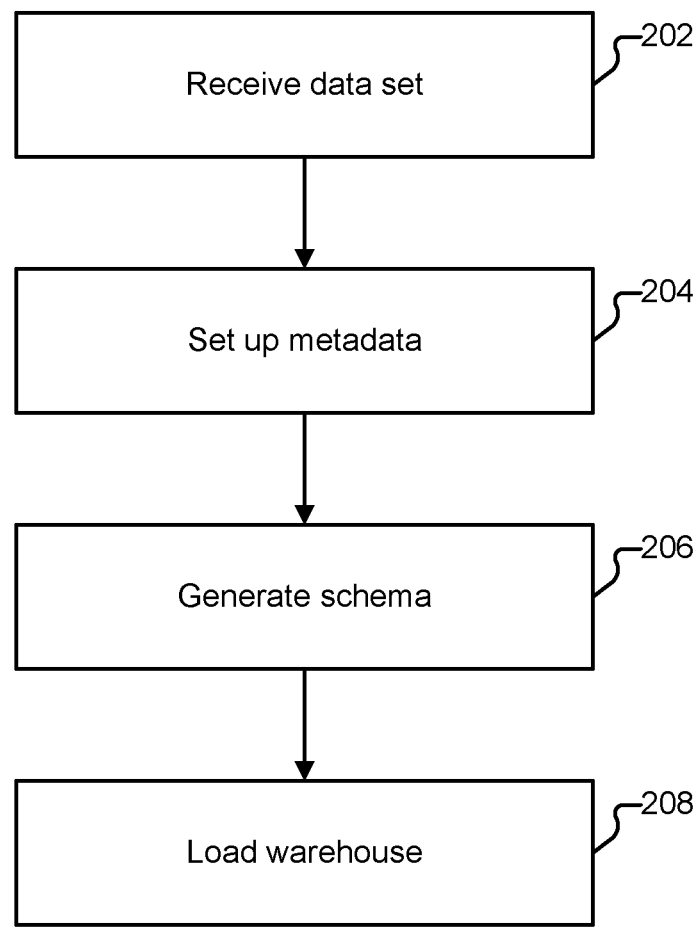
FIG. 2 is a flow chart illustrating an embodiment of a process for generating a data warehouse.

FIG. 2 is a flow chart illustrating an embodiment of a process for generating a data warehouse. In some embodiments the process shown in FIG. 2 is performed by system 106. The process begins at 202 when data is received. For example, at 202, client 102 uploads source data 104 via a web form provided by communication interface 108 to users that have registered for Internet-accessible accounts on system 106.

At 204, metadata is set up. As described in more detail below, portions of the processing may be performed manually (e.g., by a user or with user input) and portions of the processing may also be performed automatically. Metadata is stored in a repository such as metadata repository 112. For each table received at 202, two pieces of metadata are created. The grain of each table, describing the set of levels that are appropriate for each file, is determined. For each column in those files, a target dimension and level, and whether the column is measure, is also determined. Finally, a set of hierarchies are created, and certain levels are selected to be turned into dimension tables.

At 206, metadata that defines a corresponding schema is generated, as is the database schema. First, all levels of all dimensions that are designated to be dimension tables are evaluated. For each level, each source staging table is examined. If the table has a grain in the dimension of the appropriate level and the level of that grain is at or above the level in question, the table is a candidate. All columns are scanned to determine which could be sources for that target dimension table. Once all source tables are scanned, each dimension table is created based on all the columns from all source files that are targeted to that level. All source tables are similarly scanned to determine which columns are measures and a measure table is generated for each grain.

At 208, the warehouse is loaded. First, the system scans source tables in order to move data from those tables into target dimension tables. All source records are marked with a checksum before loading (so that only changed records will be moved). The system generates inserts into the target dimension table for each staging table that is a source. Additional staging tables are joined in to supply related columns not in that table (e.g., higher level keys). Higher level dimension tables also serve as lookups for keys. Levels are loaded in descending order. If the dimension table is type I (i.e., only current versions of each dimension record are kept), then the system does an update for any non-inserted dimensional records that may have changed attributes. If the dimension table is type II (i.e., history is kept), dimension records that have changed are flagged as retired, and inserts add the new records with the changed attributes.

Next, the system scans source tables to find sources for all measure grains. In the case of snapshots, old records may be truncated, as applicable. In the case of inserts, higher level surrogate keys are looked up from the dimension tables. Natural keys—which may be composed of multiple columns—are transformed into simple integer surrogate keys for performance.

Figure 3:
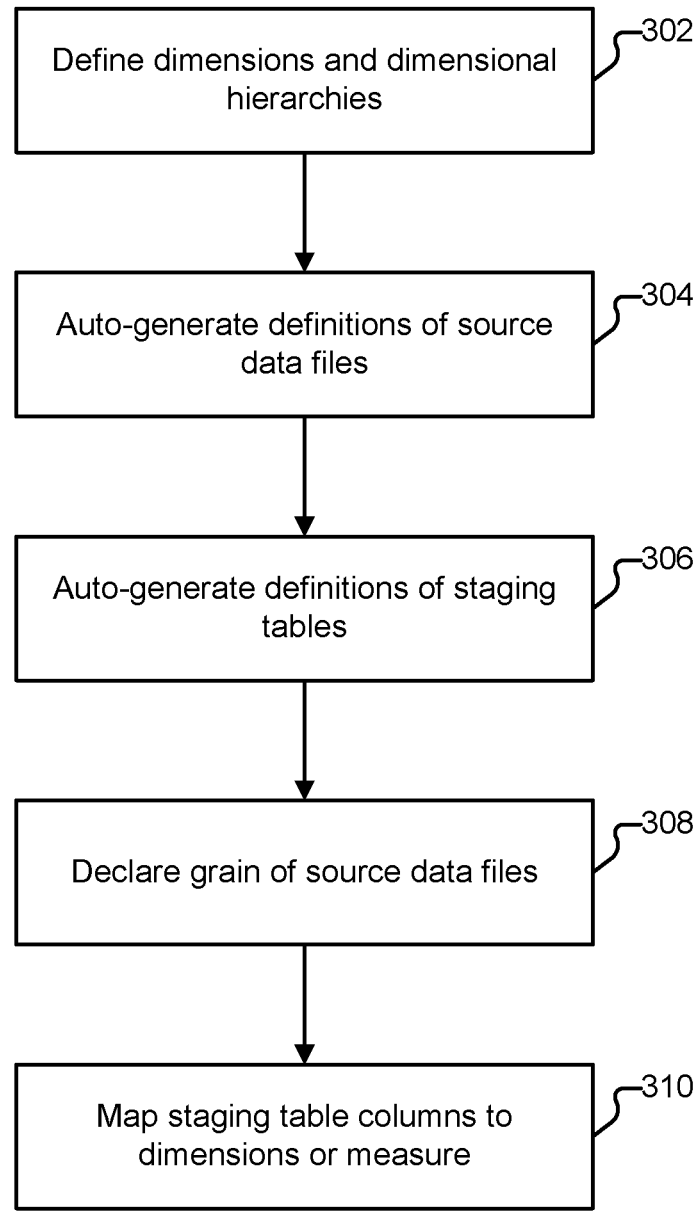
FIG. 3 illustrates an example of a process for setting up metadata.

FIG. 3 illustrates an example of a process for setting up metadata. In some embodiments the processing shown in FIG. 3 is performed at portions 202 and 204 in the process shown in FIG. 2. The process begins at 302 when a user defines logical dimensions and associated dimensional hierarchies, such as by using metadata editor 120. The dimensional hierarchies are specified through a user interface (UI) that can take any suitable form (e.g. a graphical interface, a command line, a world-wide-web interface accessible by a web browser, or any other input mechanism).

At 304, source data files are read by data warehouse generation engine 110 and a definition of each source file is automatically generated in metadata repository 112. The definition of a source file includes information such as format type, name and data type for each column and may be modified by the user via editor 120.

At 306, corresponding definitions of staging tables are automatically created in metadata repository 112 based on source data file representations. Based on a user's input, more than one staging table may be defined based on a single source data file. A user may modify the staging table definitions using metadata editor 120. Staging tables serve as a temporary holding or staging place for data when it is brought into a relational database for the first time.

At 308, the user declares the grain of each staging table using the metadata editor 120. The grain is declared as a reference to at least one logical dimension and a level in the associated dimensional hierarchy.

At 310, the user declares each column in a staging table to be a source to a dimension, to a fact/measure (or to both simultaneously) using metadata editor 120. A user may define table transformations on a staging table and column transformations for columns in a staging table. These transformations allow data in a staging table to be altered/modified before it is moved to its ultimate destination, the dimension and measure tables.

Figure 4:
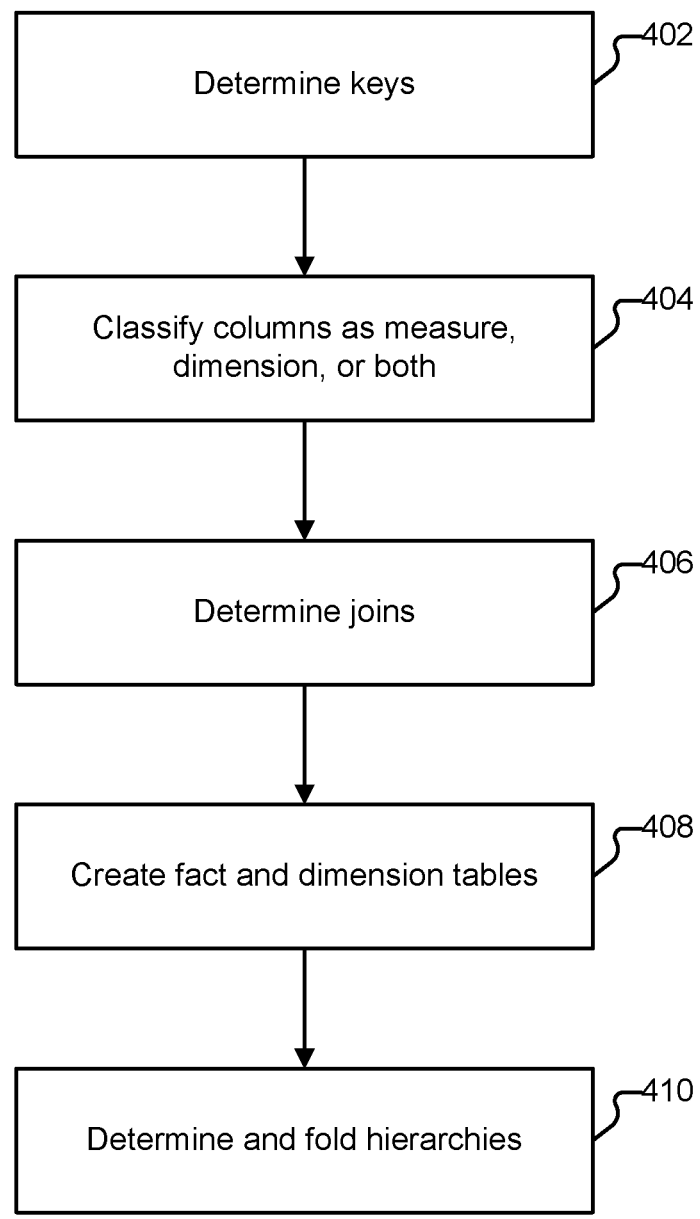
FIG. 4 illustrates an example of a process for setting up metadata.

FIG. 4 illustrates an example of a process for setting up metadata. In some embodiments the processing shown in FIG. 4 is performed at portion 204 in the process shown in FIG. 2. The process begins at 402 when system 106 determines, automatically, for each row in each table, what the most appropriate key is. In some cases the key—known as a natural key is provided in a single column. In other cases, a combination of columns may need to be combined to serve as a key. In this example, the resulting key is referred to as a synthetic key. If a synthetic key is needed, in some embodiments system 106 weights the data types of the columns it evaluates for use in the synthetic key. For example, system 106 is in some embodiments configured to prefer integers over floats. If neither a natural key nor a synthetic key can be found, in some embodiments a key is generated and included as an additional column in the data.

The data provided at portion 202 of the process shown in FIG. 2 is typically provided in a flat form. The target data structures to be built by system 106 are analytical ones based on notions of a dimensional structure, such as cubes, hypercubes, etc. Accordingly, once the keys have been determined at 402, system 106 attempts to assemble the information into a dynamical hierarchal structure.

At 404, each of the columns in the source data is classified as either a measure, a dimension, or both. By default, system 106 classifies columns as both a measure (a source for metrics) and a dimension (a source for dimensional attributes). Typically, columns populated with numeric values are classified as both measures and dimensions, and columns populated with text strings are classified only as dimensions.

At 406, joins are determined. For example, two columns with the same name and same data type are considered to be the same column and can be linked.

At 408, system 106, for every level of data in each dimension, creates a dimension table that stores dimensional attributes. System 106 then evaluates the source tables to determine which metrics need to be generated, groups them into grains, and for each grain creates a fact table.

At 410, hierarchies are determined and combined. For example, at 410 it is determined that a particular dimension table for geography at the region level can be fed from a particular table and that geography at the city level is a "lower" level in the hierarchy.

Example—Shopping Scenario

In the following example, suppose an analyst (hereinafter "Alice") works for a grocery store chain and has been asked to analyze checkout data collected from a sample of markets in North America over the course of one year. As described in the following example, Alice wishes to identify sales patterns and information of interest and to present a set of dashboards to the grocery store chain's managers. Alice contacts system 106 via client 102 and uploads sales data in the form of a MICROSOFT EXCEL file that includes five spreadsheets. Alice may interact with system 106 in either an "automatic" mode (in which the bulk of the processing is performed automatically by system 106, such as by using the process of FIG. 4), or in an advanced mode, described below.

FIG. 5 illustrates an example of a table that identifies twenty products grouped into four product categories. FIG. 6 illustrates an example of a portion of a table that identifies 100 customers, including age and gender information. FIG. 7 illustrates an example of a portion of a table that identifies 100 grocery stores of three times across twelve cities. FIG. 8 illustrates an example of a portion of a table that identifies 3,000 shopping baskets. FIG. 9 illustrates an example of a portion line item details for the shopping baskets.

FIG. 10A illustrates an example of an interface. When Alice uploads her source data to system 106, system 106 scans the data in the spreadsheets to identify column types and the relationships between the sheets. Alice is then presented with the interface shown.

In order to process source data, its grain needs to be defined first. The grain of a data source defines what a data record in the source represents. It specifies the level of detail captured in a source. In system 106, the grain is declared as a combination of hierarchy levels. System 106 establishes relationships between multiple sources based on key columns with identical names and the grains of the sources.

Alice can define the grain of the "Cart Details" data source by selecting region 1002 of the interface shown in FIG. 10A. She creates a new hierarchy, known as "Sales." The "Card ID" and "Product ID" columns of the "Cart Details" table uniquely identify records in the Cart Details table and form a "Product Sale" level in the Sales hierarchy.

FIG. 10B illustrates an example of an interface. When Alice is finished making changes to the "Cart Details" definition, she is presented with the interface shown in FIG. 10B.

Analogous to the actions taken by Alice in conjunction with FIGS. 10A and 10B, Alice takes the following actions: For the "Customers" data source, she creates a new hierarchy named "Customers" with a single level "Customer" mapped to the column "Loyalty Card ID." For the "Products" data source, she creates a new hierarchy named "Products" with two levels, one level "Product" mapped to "Product ID" and a level above it named "Category" mapped to "Category ID." For the "Shopping Carts" data source, she modifies the existing "Sales" hierarchy by adding a level "Cart" mapped to "Cart ID" above the existing "Product Sale" level. For the "Stores" data source, she creates a new hierarchy named "Stores" with a single level "Store" mapped to "Store ID."

FIG. 10C illustrates an example of an interface. When Alice is finished making changes to the above definitions, she is presented with the interface shown in FIG. 10C.

Figure 11A:
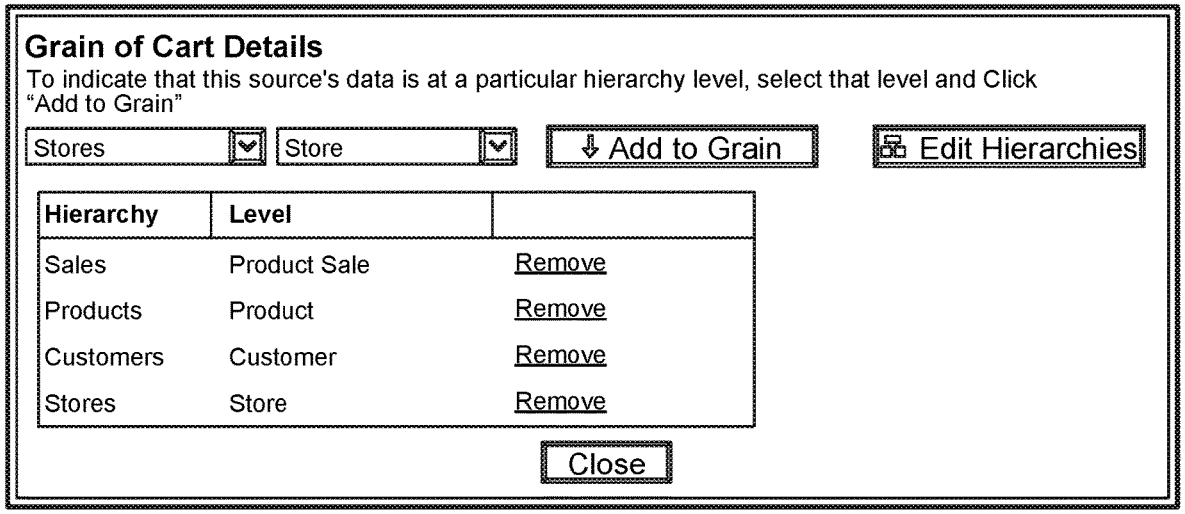
FIG. 11A illustrates an example of an interface.

Once the hierarchies and levels are in place, Alice uses the interface shown in FIG. 11A to finalize the grain definition for some sources. For "Cart Details" she adds the following three hierarchy-level combinations to the grain definition by selecting it from the two drop downs in the "Define Grain" section for the source: "Products-Product," "Customers-Customer," and "Stores-Store." The second two are added to the grain definition to force system 106 to create a "Sales Date" version of the "Quantity" measure.

Figure 11B:
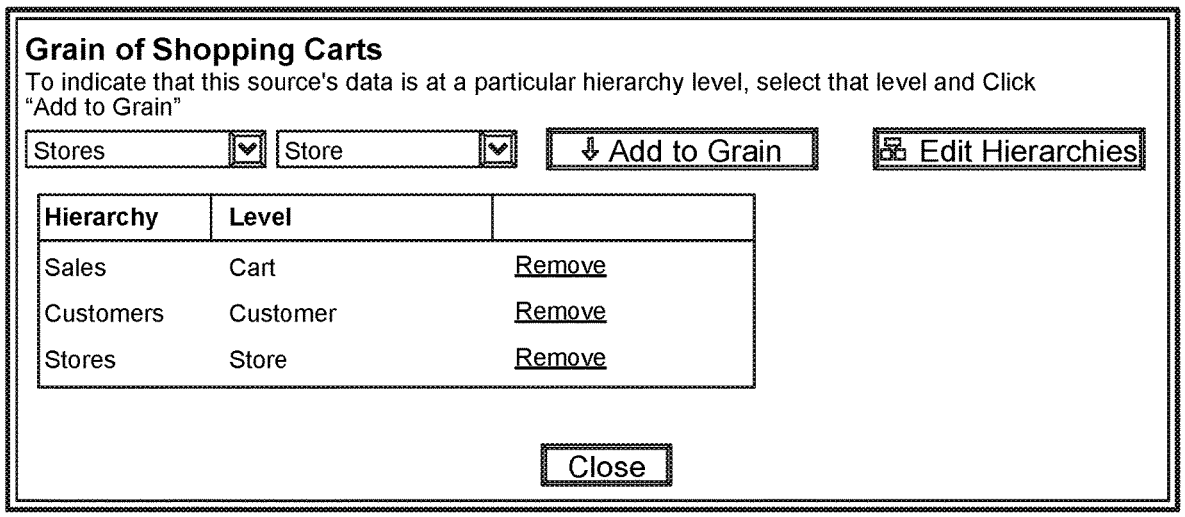
FIG. 11B illustrates an example of an interface.

Alice then uses the interface shown in FIG. 11B to remove the automatically added hierarchy-level combination "Sales-Product Sale" from "Shopping Carts." Next, she adds "Sales-Cart," "Customers-Customer," and "Stores-Store" to the grain definition.

Before proceeding to processing the data sources, the properties of all columns in a data source should be defined. Alice makes the following adjustments: For the data source "Cart Details," she indicates that the "Cart ID" and "Product ID" columns are needed as measures. She sets the hierarchy of the "Quantity" column to "Sales" and makes the level blank. For the remaining sources, she sets the column properties as shown in FIG. 12.

Next, Alice indicates to system 106 that the grocery data should be processed, through the interface shown in FIG. 13. System 106 allows users to upload new snapshots of the same data sources over time. Each time a new snapshot is uploaded, it is tagged with a unique load ID and date. The load date is used for time-dependent analysis. When Alice opens the Process Data page shown in FIG. 13, system 106 sets the load date by default to the current date.

After successfully processing the uploaded data, Alice is now ready to analyze the data and build reports. She begins by building a simple report that breaks out quantity sold by each product category using tools provided by system 106. First, she opts to view the quantity of products sold by category and is presented with the report shown in FIG. 14A.

Alice may share the report with others, e.g. via interface 108. Alice can also manipulate the report. For example, Alice can indicate to system 106 that she would like to see "Year/Month" data in addition to "Category Name" and "Quantity."

Figures 14A, 14B, 14C:
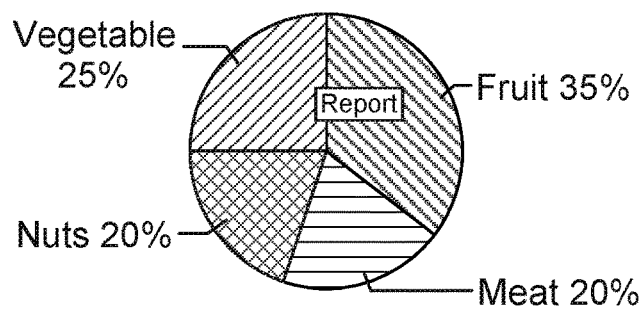
FIG. 14A illustrates an example of reporting data.
FIG. 14B illustrates an example of reporting data.
FIG. 14C illustrates an example of reporting data.

As shown in FIG. 14B, the resulting table shows a single value for "Year/Month" across all rows. The existing "Quantity" measure will report the quantity sold in relation to the load date. Since Alice has so far only loaded her data a single time, only one load date exists and therefore "Year/Month" is single valued. In order to report the quantity sold in relation to the sales date, system 106 provides another version of the "Quantity" measure starting with the prefix "Sales Date." To see it, Alice removes the "Sum: Quantity" column from the report by clicking on the "Remove chart" icon and adds the measure "Sum" from the folder Measures/Quantity/By Sales Date to the report. Since the dataset contains sales data for all twelve months in 2007, instead of showing a row for each month of the year across all product categories, a pivot table can be used to display the report, as shown in FIG. 14C.

Additional Example

The following is yet another example of how a data warehouse can be automatically generated. The first step is to map in source data files, for example, as explained above. One example of source data include extracts of many tables in a relational database that tracks orders for a company for a given period of time. Another example, in the case of a financial services company, would be all trades, transactions, accounts and other financial information generated in the normal course of operating the business. The files serve as sources for staging tables. Staging tables are places in a relational database where raw source data can be loaded for further processing.

In some embodiments, an administrator initially sets up the general hierarchies present in the data. For example, the data contains information on products and product categories. Each product category is made up of several products. That relationship can be represented in a product hierarchy where the name of the hierarchy is Product, the top level is Category and the bottom level is Product. Similarly, if order data is received, some data will pertain to the entire order (like customer, etc.) and other data will pertain to each order line item. An order hierarchy can be erected with both levels. Using this hierarchy, the system can be instructed what granularity of data is in each staging table. As one example, an Orders staging table has an Order level of the Order hierarchy selected as well as the Customer level of the Customer hierarchy and the Employee level of the employee hierarchy. That is because each order record has assigned order information, a specific customer and a specific employee—its grain. The order item table is one level deeper and contains information at the Order Item level of the Order hierarchy.

Schema includes fact tables and dimension tables. Fact tables include metrics to be aggregated and dimension tables include ways to group or slice these facts. Using the techniques described herein, fact tables are automatically generated for each grain for which there are aggregateable metrics. In addition, by clicking on a checkbox for a given level in a hierarchy, the system will automatically determine the table format required to build a dimension table for that level. In some embodiments it does so by first determining which columns must be present in the dimension table at this level (by scanning all columns in all staging tables that are targeted to this level). Those columns and their required data types and formats as well as the keys for each level determine what is required in that table. In addition, special types of dimension tables can be supported (for example, like below, slowly changing dimension versions of dimension tables that record history and degenerate dimension tables that are stored in the fact tables themselves). All an administrator needs to do is specify the level, identify the column which uniquely defines that level (a level key) and then check the box to have a dimension table created for that level. Once all levels in a dimension are specified, the system can determine, using the dimension targets in the staging tables as well as the grain levels for each staging table what columns must be placed in which instantiated dimension table. Each column must be in a table at or below the level specified for that column.

In addition, metrics can be analyzed over time and there are various ways users might want to aggregate data over time. With the techniques described herein, the user can specify all the different kinds of time aggregation or shifting that one desires and all the variants of the metrics that calculate these versions are generated automatically.

Once the previous have been specified, an automatic schema generation tool can be run (i.e. the application can be "built"). When that happens definitions for many tables get created, all the columns in those tables are created, keys are created into those tables for later access and join relationships based on the hierarchies are also setup. During an application build, previously automatically built items are removed and automatically generated items are regenerated. Surrogate keys are automatically generated and added to the hierarchies after a build. In addition, new metrics are created based on columns in the staging tables (using the grain of the staging table, data types, etc. to infer metrics). Additionally, individual physical mappings are also generated (each metric may exist in one or more physical tables—each at a different grain of aggregation).

Dimension columns are automatically created in each dimension. And, dimension columns are physically mapped to tables. Suppose there is a dimension table for Order data and a dimension table for individual order line item data. The system automatically determines based on source table grain and hierarchies which columns should go where and how they should be mapped.

Finally, once the schema is determined for the warehouse, load processes need to be generated to populate this schema from source staging tables. Using the techniques herein, an analysis is performed of each target table against every staging table and it is determined what can be loaded from where. It then automatically generates the data load queries for the database that load the target tables from the staging tables.

Quick Dashboards

In addition to providing the reporting tools described above, system 106 also provides a dashboard engine 118 that assists users such as Alice in automatically locating information that is likely to be of interest, such as to the grocery store managers. As described in more detail below, dashboard engine 118 is configured to evaluate the source data provided by Alice for metrics of interest, to locate metric-attribute combinations (such as number of products sold per region), and to populate a dashboard with reports associated with the metric-attribute combinations that are likely to be of interest to Alice.

Figure 15:
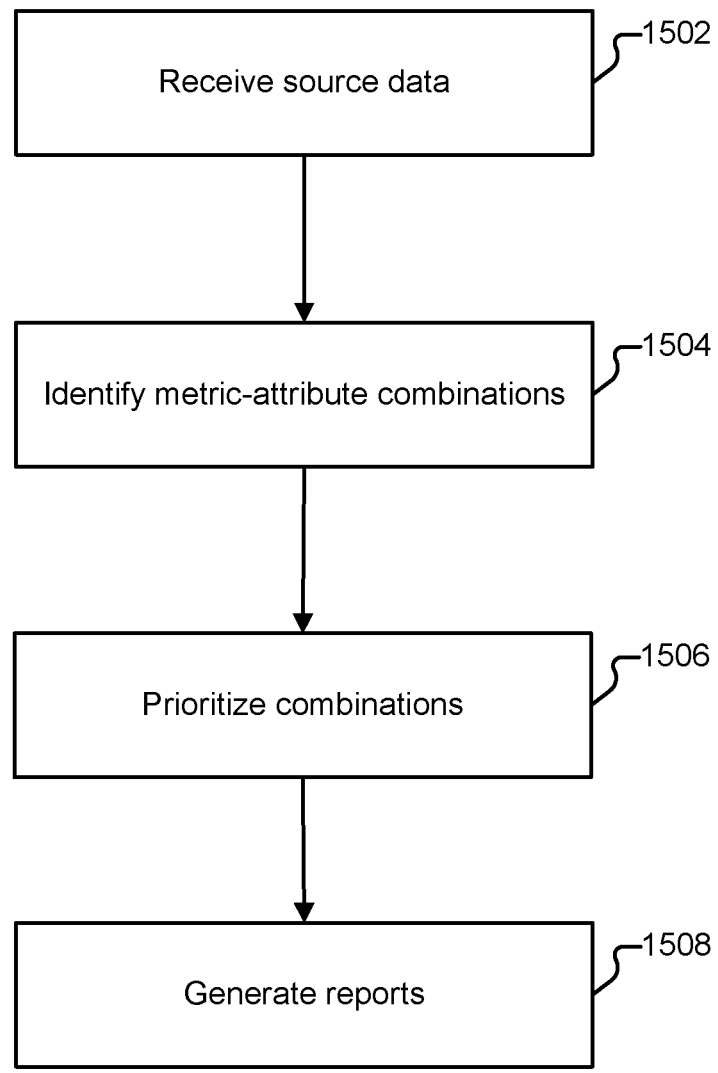
FIG. 15 is a flow chart illustrating an embodiment of a process for constructing a set of reports.

FIG. 15 is a flow chart illustrating an embodiment of a process for constructing a set of reports. In some embodiments the process shown in FIG. 15 is performed by system 106.

The process begins at 1502 when source data is received. For example, when Alice uploads source data 1504 to system 106, both data warehouse generation engine 110 and dashboard engine 118 may ingest the data at the same time. In various embodiments, dashboard engine 118 receives data (including as realtime data) from data warehouse generation engine 110, relational database 116, or another component of system 106, rather than receiving it at the time Alice provides the source data to the system. In various embodiments, dashboard engine 118 receives data from a third party and/or portions of system 106 such as the data warehouse generation engine are omitted and the techniques described herein are adapted with respect to quick reports are used on other types of data or data sets, as applicable.

At 1504, metric-attribute combinations are identified and at 1506 the combinations are prioritized. Portions 1504 and portions 1506 can be performed together, may be performed in either order, and may be performed in a variety of ways. As one example, all of the metrics extracted from source data 104 by data warehouse generation engine 110 may first be evaluated to determine which metrics have the least uniform statistical distribution. Metric-attribution combinations include at least one metric and at least one attribute, but may include additional metrics and/or attributes as well. One technique for determining which metrics have the least uniform distribution is kurtosis. Other techniques may also be used, such as skewness.

The metrics showing the least uniform distribution (e.g., the top 10 out of 100 possible metrics) then have their associated attributes evaluated, again, to select the combinations of metrics and attributes (e.g., quantity per city) that are likely to be of interest to Alice. One technique for evaluating the candidate metric-attribute combinations is through the use of decision trees. Generally, attributes with a higher information gain relative to a chosen metric will likely be more interesting to a user than attributes having a lower information gain. Additional techniques for selecting the most significant attributes include the use of chi-squared automatic interaction detector, classification and regression trees, entropy, and any other applicable node splitting techniques.

The metric-attribute combinations are ranked, e.g., based on information gain, and the highest ranked combinations are used to generate reports showing such information as quantity sold per region. In various embodiments, multiple reports are presented on the same screen, referred to herein as a dashboard. Alice can share access to the dashboard with others users, and can also interact with the dashboard, e.g, by adding and removing additional attributes and/or metrics from inclusion in the reporting. For example, suppose one report selected for display to Alice is products by region. In various embodiments, Alice is provided with an interface that allows her to refine the report so that it shows products by region by time.

Data Example

The following is an example of a log file generated by an embodiment of system 106 when processing the data described in conjunction with FIGS. 5-9.

2009-03-05 17:21:38,296-0800 [Pool Worker—9] INFO—Starting: Repository c:\SMI\Data\389a3dee-ce29-4e42-90ad-44970093f745\repository_dev.xml 2009-03-05 17:21:38,609-0800 [Pool Worker—9] INFO—Application Name: Grocery Sales/schst@example.com 2009-03-05 17:21:38,906-0800 [Pool Worker—9] INFO—Engine Repository Version: 7, Repository Version: 7

2009-03-05 17:21:38,906-0800 [Pool Worker—9] DEBUG—File: Cart Details.txt, Encoding: UTF-8, Separator: |, Quote: ", IgnoredRows: 0, IgnoredLastRows: 0, HasHeaders: true, IgnoreBackslash: false 2009-03-05 17:21:38,906-0800 [Pool Worker—9] DEBUG—File: Customers.txt, Encoding: UTF-8, Separator: |, Quote: ", IgnoredRows: 0, IgnoredLastRows: 0, HasHeaders: true, IgnoreBackslash: false 2009-03-05 17:21:38,906-0800 [Pool Worker—9] DEBUG—File: Products.txt, Encoding: UTF-8, Separator: |, Quote: ", IgnoredRows: 0, IgnoredLastRows: 0, HasHeaders: true, IgnoreBackslash: false 2009-03-05 17:21:38,906-0800 [Pool Worker—9] DEBUG—File: Shopping Carts.txt, Encoding: UTF-8, Separator: 1, Quote: ", IgnoredRows: 0, IgnoredLastRows: 0, HasHeaders: true, IgnoreBackslash: false 2009-03-05 17:21:38,906-0800 [Pool Worker—9] DEBUG—File: Stores.txt, Encoding: UTF-8, Separator: |, Quote: ", IgnoredRows: 0, IgnoredLastRows: 0, HasHeaders: true, IgnoreBackslash: false 2009-03-05 17:21:38,937-0800 [Pool Worker—9] INFO—Database connection pool created for Default Connection using connection string jdbc:sqlserver://localhostdatabaseName=AcornData and driver com.microsoft.sqlserver.jdbc.SQLServerDriver 2009-03-05 17:21:39,437-0800 [Pool Worker—9] INFO—JDBC Driver information: Microsoft SQL Server 2005 JDBC Driver, 1.2.2828.100

2009-03-05 17:21:39,437-0800 [Pool Worker—9] INFO—JDBC Version: 3.0

2009-03-05 17:21:40,078-0800 [Pool Worker—9] INFO—Creating snowflake: [Cart_Details Cart_Details, Cart_Details Shopping_Carts]

2009-03-05 17:21:40,140-0800 [Pool Worker—9] INFO—Creating snowflake: [Cart_Details Shopping_Carts, Cart_Details Customers Customers]

2009-03-05 17:21:40,171-0800 [Pool Worker—9] INFO—Creating snowflake: [Cart_Details Shopping_Carts, Cart_Details Stores Stores]

2009-03-05 17:21:40,203-0800 [Pool Worker—9] INFO—Creating snowflake: [Cart_Details Cart_Details, Cart_Details Shopping_Carts, Cart_Details Customers Customers]

2009-03-05 17:21:40,234-0800 [Pool Worker—9] INFO—Creating snowflake: [Cart_Details Cart_Details, Cart_Details Shopping_Carts, Cart_Details Stores Stores]

2009-03-05 17:21:40,343-0800 [Pool Worker—9] INFO—Creating snowflake: [Cart_Details Shopping_Carts, Cart_Details Customers Customers, Cart_Details Stores Stores]

2009-03-05 17:21:40,421-0800 [Pool Worker—9] INFO—Instantiating the cache: c:/SMI/Data/389a3dee-ce29-4e42-90ad-44970093f745/cache 2009-03-05 17:21:40,421-0800 [Pool Worker—9] DEBUG—Creating JDBM Record Manager: cISMI/Data/389a3dee-ce29-4e42-90ad-44970093f745/cache\cacheMaps 2009-03-05 17:21:40,500-0800 [Pool Worker—9] DEBUG—Creating JDBM HTree Instance: cmap 2009-03-05 17:21:40,531-0800 [Pool Worker—9] DEBUG—Creating JDBM HTree Instance: cfmap 2009-03-05 17:21:40,546-0800 [Pool Worker—9] DEBUG—Creating JDBM HTree Instance: emap 2009-03-05 17:21:40,546-0800 [Pool Worker—9] DEBUG—Creating JDBM HTree Instance: rmap 2009-03-05 17:21:40,562-0800 [Pool Worker—9] INFO—Repository Variable Initialization Started.

2009-03-05 17:21:40,562-0800 [Pool Worker—9] INFO—Variable: LoadNumber=1

2009-03-05 17:21:40,562-0800 [Pool Worker—9] INFO—Variable: LoadDate=5-Mar-2009

2009-03-05 17:21:40,562-0800 [Pool Worker—9] INFO—Repository Variable Initialization Complete.

2009-03-05 17:21:40,578-0800 [Pool Worker—9] INFO—Security Settings for Passwords: min: 6, max: 100, upper and lower case: false, non-alphanumeric: false, not contain the username: false 2009-03-05 17:21:40,578-0800 [Pool Worker—9] WARN—Create User Operation (Create User) does not exist 2009-03-05 17:21:40,578-0800 [Pool Worker—9] WARN—Delete User Operation (Delete User) does not exist 2009-03-05 17:21:40,578-0800 [Pool Worker—9] WARN—Disable User Operation (Disable User) does not exist 2009-03-05 17:21:40,578-0800 [Pool Worker—9] DEBUG—Connection allocated for thread (Thread[Pool Worker—9,5,main])

2009-03-05 17:21:40,656-0800 [Pool Worker—9] WARN—SMI_USERS either does not exist or does not have 2 [username, password] or 4 [username, password, fullname, email] columns; disabling DB-based authentication and authorization 2009-03-05 17:21:40,656-0800 [Pool Worker—9] WARN—Problems encountered when trying to create DatabaseRealm, using Repository only for authentication and authorization 2009-03-05 17:21:40,781-0800 [Pool Worker—9] INFO—Performance Model: Default Performance Model: reference population does not exist: Default Reference Population 2009-03-05 17:21:40,859-0800 [Pool Worker—9] DEBUG—CREATE TABLES_N389a3dee_ce29_4e42_90ad 44970093f745.TXN_COMMAND_HISTORY ([TM] DATETIME,[COMMAND_TYPE] VARCHAR(30), [STEP] VARCHAR(30),[SUBSTEP] VARCHAR(255),[ITERATION] VARCHAR(20),[STATUS] INTEGER,[NUMROWS] BIGINT,[NUMERRORS] BIGINT, [NUMWARNINGS] BIGINT,[MESSAGE] VARCHAR (1000))

2009-03-05 17:21:40,875-0800 [Pool Worker—9] DEBUG—CREATE INDEX DX_TXN_COMMAND_HISTORYITERATION ON S_N389a3dee_ce29_4e42_90ad_44970093f745. TXN_COMMAND_HISTORY (ITERATION)

2009-03-05 17:21:40,906-0800 [Pool Worker—9] INFO—Elapsed Time=0 minutes, 2 seconds for: Repository c:\SMI\Data\389a3dee-ce29-4e42-90ad-44970093f745\repository_dev.xml 2009-03-05 17:21:41,328-0800 [Pool Worker—10] INFO—Starting: SetVariable LoadDate 5-Mar-2009

2009-03-05 17:21:41,328-0800 [Pool Worker—10] INFO—Set repository variable 'LoadDate' to value '5 Mar. 2009'

2009-03-05 17:21:41,328-0800 [Pool Worker—10] INFO—Elapsed Time=0 minutes, 0 seconds for: SetVariable LoadDate 5-Mar-2009
2009-03-05 17:21:41,328-0800 [Pool Worker—10] INFO—Starting: ResetETLRun 1
2009-03-05 17:21:41,328-0800 [Pool Worker—10] DEBUG—Clearing ETL history for 1
2009-03-05 17:21:41,328-0800 [Pool Worker—10] INFO—Deleting previous data from TXN_COMMAND_HISTORY
2009-03-05 17:21:41,328-0800 [Pool Worker—10] DEBUG—DELETE
FROM
S_N389a3dee_ce29_4e42_90ad 44970093f745.TXN_COMMAND_HISTORY
WHERE ITERATION='1' AND COMMAND_TYPE='ETL'
2009-03-05 17:21:41,328-0800 [Pool Worker—10] DEBUG—Connection allocated for thread (Thread[Pool Worker—10,5,main])
2009-03-05 17:21:41,328-0800 [Pool Worker—10] DEBUG—Deleted 0 rows
2009-03-05 17:21:41,328-0800 [Pool Worker—10] INFO—Elapsed Time=0 minutes, 0 seconds for: ResetETLRun 1
2009-03-05 17:21:41,328-0800 [Pool Worker—10] INFO—Starting: GenerateSchema 1 notime
2009-03-05 17:21:41,359-0800 [Pool Worker—10] DEBUG—Logging step GenerateSchema for 1, status Running
2009-03-05 17:21:41,359-0800 [Pool Worker—10] INFO—Starting GenerateSchema
2009-03-05 17:21:41,406-0800 [Pool Worker—10] DEBUG—CREATE TABLES_N389a3dee_ce29_4e42_90ad_44970093f745. DW_DM_CART_DETAILS_SHOPPING_CARTS ([Cart_ID$] INTEGER,[Store_ID$] INTEGER, [Loyalty_Card_ID$] INTEGER,[Sales_Date$] DATETIME,[Shopping_Carts_13875573$] INTEGER IDENTITY,[LOAD_ID] INTEGER,[ST_Cart_Details_CKSUM$] INTEGER,[ST_Shopping_Carts_CKSUM$] INTEGER)
2009-03-05 17:21:41,562-0800 [Pool Worker—10] DEBUG—CREATE TABLES_N389a3dee_ce29_4e42_90ad_44970093f745. DW_DM_CART_DETAILS_CART_DETAILS ([Cart_ID$] INTEGER,[Product_ID$] INTEGER,[Quantity$] INTEGER,[Shopping_Carts 13875573$] INTEGER, [Cart_Details200351043$] INTEGER IDENTITY,[LOAD_ID] INTEGER,[ST_Cart_Details_CKSUM$] INTEGER)
2009-03-05 17:21:41,640-0800 [Pool Worker—10] DEBUG—CREATE TABLES_N389a3dee_ce29_4e42_90ad_44970093f745. DW_DM_CUSTOMERS_CUSTOMERS ([Loyalty_Card_ID$] INTEGER,[Age_Group$] NVARCHAR(8),[Gender$] NVARCHAR(6),[Customers120094747$] INTEGER IDENTITY,[LOAD_ID] INTEGER,[ST_Customers_CKSUM$] INTEGER,[ST_Shopping_Carts CKSUM$] INTEGER)
2009-03-05 17:21:41,750-0800 [Pool Worker—10] DEBUG—CREATE TABLES_N389a3dee_ce29_4e42_90ad_44970093f745. DW_DM_PRODUCTS_PRODUCTS ([Product_ID$] INTEGER,[Category_ID$] INTEGER,[Product_Name$] NVARCHAR(10), [Category_Name$] NVARCHAR(9), [Products1249892458$] INTEGER IDENTITY,[LOAD_ID] INTEGER,[ST Products CKSUM$] INTEGER, [ST_Cart_Details_CKSUM$] INTEGER)
2009-03-05 17:21:41,859-0800 [Pool Worker—10] DEBUG—CREATE TABLES_N389a3dee_ce29_4e42_90ad_44970093f745. DW_DM_STORES_STORES ([Store ID$] INTEGER, [Region$] NVARCHAR(5), [City$] NVARCHAR(15),[Type$] NVARCHAR(11),[Stores1543357431$] INTEGER IDENTITY,[LOAD_ID] INTEGER,[ST_Stores_CKSUM$] INTEGER,[ST_Shopping_Carts_CKSUM$] INTEGER)
2009-03-05 17:21:41,921-0800 [Pool Worker—10] DEBUG—CREATE TABLES_N389a3dee_ce29_4e42_90ad_44970093f745. DW_SF_CART_DETAILS_DAY_PRODUCTS_CUSTOMERS_STORES ([LOAD_ID] INTEGER,[Cart_Details$Cart_Details200351043$] INTEGER,[Cart_Details$Cart_ID$] INTEGER,[Cart_Details$Product_ID$] INTEGER,[Products$Products1249892458$] INTEGER, [Products$Product ID$] INTEGER,[Customers$Customers120094747$] INTEGER,[Customers$Loyalty_Card_ID$] INTEGER, [Stores$Stores1543357431$] INTEGER,[Stores$Store_ID$] INTEGER,[Cart_Details$Shopping_Carts_13875573$] INTEGER,[Time$Day_ID$] INTEGER,[Time$Week_ID$] INTEGER,[Time$Month_ID$] INTEGER,[Time$Quarter_ID$] INTEGER, [Cart_ID$] INTEGER,[Product_ID$] INTEGER,[Quantity$] INTEGER,[Time$Sales_Date_Day_ID$] INTEGER)
2009-03-05 17:21:42,062-0800 [Pool Worker—10] DEBUG—CREATE TABLES_N389a3dee_ce29_4e42_90ad_44970093f745. DW_SF_SHOPPING_CARTS_DAY_CUSTOMERS_STORES ([LOAD_ID] INTEGER, [Cart_Details$Shopping_Carts_13875573$] INTEGER, [Cart Details$Cart_ID$] INTEGER,[Customers$Customers120094747$] INTEGER, [Customers $Loyalty_Card_ID$] INTEGER,[Stores $ Stores1543357431$] INTEGER,[Stores$Store_ID$] INTEGER,[Time$Day_ID$] INTEGER,[Time$Week_ID$] INTEGER, [Time$Month_ID$] INTEGER,[Time$Quarter_ID$] INTEGER,[Cart_ID$] INTEGER,[Loyalty_Card_ID$] INTEGER,[Store_ID$] INTEGER,[Time$Sales_Date_Day_ID$] INTEGER)
2009-03-05 17:21:42,140-0800 [Pool Worker—10] DEBUG—CREATE TABLES_N389a3dee_ce29_4e42_90ad_44970093f745. DW_SF_PRODUCTS_DAY ([LOAD_ID] INTEGER, [Products$Products1249892458$] INTEGER,[Products$Product ID$] INTEGER,[Time$Day_ID$] INTEGER, [Time$Week_ID$] INTEGER,[Time$Month_ID$] INTEGER,[Time$Quarter_ID$] INTEGER,[Product_ID$] INTEGER,[Category_ID$] INTEGER,[Unit_Price$] FLOAT)
2009-03-05 17:21:42,234-0800 [Pool Worker—10] DEBUG—CREATE TABLES_N389a3dee_ce29_4e42_90ad_44970093f745. DW_SF_CUSTOMERS_DAY ([LOAD_ID] INTEGER, [Customers$Customers120094747$] INTEGER,[Customers$Loyalty_Card_ID$] INTEGER,[Time$Day_ID$] INTEGER,[Time$Week_ID$] INTEGER,[Time$Month_ID$] INTEGER,[Time$Quarter_ID$] INTEGER,[Loyalty_Card_ID$] INTEGER)
2009-03-05 17:21:42,281-0800 [Pool Worker—10] DEBUG—CREATE TABLES_N389a3dee_ce29_4e42_90ad_44970093f745. DW_SF_STORES_DAY ([LOAD_ID] INTEGER,[Stores$Stores1543357431$] INTEGER,[Stores$Store_ID$] INTEGER,[Time$Day_ID$] INTEGER,[Time$Week_ID$]

INTEGER,[Time$Month_ID$] INTEGER,[Time$Quarter_ID$] INTEGER,[Store_ID$] INTEGER)

2009-03-05 17:21:42,312-0800 [Pool Worker—10] DEBUG—Logging step GenerateSchema for 1, status Complete 2009-03-05 17:21:42,312-0800 [Pool Worker—10] INFO—Finished GenerateSchema 2009-03-05 17:21:42,312-0800 [Pool Worker—10] INFO—Elapsed Time=0 minutes, 0 seconds for: GenerateSchema 1 notime 2009-03-05 17:21:42,312-0800 [Pool Worker—10] INFO—Starting: LoadStaging c:\SMI\Data\389a3dee-ce29-4e42-90ad-44970093f745\data 1 loadgroup=ACORN databasepath=c:\SMI\Data\389a3dee-ce29-4e42-90ad-44970093f745\data numrows=−1

2009-03-05 17:21:42,375-0800 [Pool Worker—10] DEBUG—Logging step LoadStaging [ACORN] for 1, status Running 2009-03-05 17:21:42,375-0800 [Pool Worker—10] INFO—Starting LoadStaging [ACORN]

2009-03-05 17:21:42,375-0800 [Pool Worker—10] DEBUG—Logging step LoadStaging [ACORN: ST_Cart_Details] for 1, status Running 2009-03-05 17:21:42,390-0800 [Pool Worker—10] INFO—Starting LoadStaging [ACORN: ST_Cart_Details]

2009-03-05 17:21:42,390-0800 [Pool Worker—10] DEBUG—Deleting format files that might be lingering over from previous unsuccessful runprematurely terminated—Cart Details.txt.format.

2009-03-05 17:21:42,390-0800 [Pool Worker—10] DEBUG—No files found with search pattern Cart Details.txt.format 2009-03-05 17:21:42,390-0800 [Pool Worker—10] DEBUG—Deleting tmp files that might be lingering over from previous unsuccessful runprematurely terminated—Cart Details.txt.tmp.

2009-03-05 17:21:42,390-0800 [Pool Worker—10] DEBUG—No files found with search pattern Cart Details.txt.tmp 2009-03-05 17:21:42,390-0800 [Pool Worker—10] INFO—Preprocessing source file Cart Details.txt (c:\SMI\Data\389a3dee-ce29-4e42-90ad-44970093f745\data\Cart Details.txt)

2009-03-05 17:21:42,609-0800 [Pool Worker—10] INFO—Read 12438 lines, wrote 12438 lines 2009-03-05 17:21:42,609-0800 [Pool Worker—10] INFO—Successfully preprocessed source file Cart Details.txt 2009-03-05 17:21:42,656-0800 [Pool Worker—10] DEBUG—CREATE TABLES_N389a3dee_ce29_4e42_90ad_44970093f745.ST_Cart_Details ([Cart_ID$] Integer,[Product_ID$] Integer,[Quantity$] Integer,[DW_DM_CART_DETAILS_SHOPPING_CARTS_CKSUM$] INTEGER,[DW_DM_PRODUCTS_PRODUCTS_CKSUM$] INTEGER, [DW_DM_CART_DETAILS_CART_DETAILS_CKSUM$] INTEGER)

2009-03-05 17:21:42,734-0800 [Pool Worker—10] INFO—Bulk loading staging table ST_Cart_Details from source file Cart Details.txt 2009-03-05 17:21:42,734-0800 [Pool Worker—10] DEBUG—BULK INSERTS_N389a3dee_ce29_4e42_90ad_44970093f745.ST_Cart_Details FROM 'c:\SMI\Data\389a3dee-ce29-4e42-90ad-44970093f745\data\Cart Details.txt.tmp' WITH (FORMATFILE='c:\SMI\Data\389a3dee-ce29-4e42-90ad-44970093f745\data\Cart Details.txt.format',FIRSTROW=1, ROWS_PER_BATCH=12438, DATAFILETYPE='widechar')

2009-03-05 17:21:42,796-0800 [Pool Worker—10] INFO—Successfully loaded ST_Cart_Details 2009-03-05 17:21:42,796-0800 [Pool Worker—10] DEBUG—Logging step LoadStaging [ACORN: ST_Customers] for 1, status Running 2009-03-05 17:21:42,796-0800 [Pool Worker—10] INFO—Starting LoadStaging [ACORN: ST_Customers]

2009-03-05 17:21:42,796-0800 [Pool Worker—10] DEBUG—Deleting format files that might be lingering over from previous unsuccessful runprematurely terminated—Customers.txt.format.

2009-03-05 17:21:42,796-0800 [Pool Worker—10] DEBUG—No files found with search pattern Customers.txt.format 2009-03-05 17:21:42,796-0800 [Pool Worker—10] DEBUG—Deleting tmp files that might be lingering over from previous unsuccessful runprematurely terminated—Customers.txt.tmp.

2009-03-05 17:21:42,796-0800 [Pool Worker—10] DEBUG—No files found with search pattern Customers.txt.tmp 2009-03-05 17:21:42,796-0800 [Pool Worker—10] INFO—Preprocessing source file Customers.txt (c:\SMI\Data\389a3dee-ce29-4e42-90ad-44970093f745\data\Customers.txt)

2009-03-05 17:21:42,796-0800 [Pool Worker—10] INFO—Read 100 lines, wrote 100 lines 2009-03-05 17:21:42,796-0800 [Pool Worker—10] INFO—Successfully preprocessed source file Customers.txt 2009-03-05 17:21:42,859-0800 [Pool Worker—10] DEBUG—CREATE TABLES_N389a3dee_ce29_4e42_90ad_44970093f745.ST_Customers ([Loyalty_Card_ID$] Integer,[Age_Group$] NVarchar(8),[Gender$] NVarchar(6),[DW_DM_CUSTOMERS_CUSTOMERS_CKSUM$] INTEGER)

2009-03-05 17:21:42,921-0800 [Pool Worker—10] INFO—Bulk loading staging table ST_Customers from source file Customers.txt 2009-03-05 17:21:42,921-0800 [Pool Worker—10] DEBUG—BULK INSERTS_N389a3dee_ce29_4e42_90ad_44970093f745.ST_Customers FROM 'c:\SMI\Data \389a3 dee-ce29-4e42-90ad-44970093f745\data\Customers.txt.tmp' WITH (FORMATFILE='c:\SMI\Data\389a3dee-ce29-4e42-90ad-44970093f745\data\Customers.txtformat',FIRSTROW=1, ROWS_PER_BATCH=100,DATAFILETYPE='widechar')

2009-03-05 17:21:42,921-0800 [Pool Worker—10] INFO—Successfully loaded ST_Customers 2009-03-05 17:21:42,921-0800 [Pool Worker—10] DEBUG—Logging step LoadStaging [ACORN: ST_Products] for 1, status Running 2009-03-05 17:21:42,921-0800 [Pool Worker—10] INFO—Starting LoadStaging [ACORN: ST_Products]

2009-03-05 17:21:42,921-0800 [Pool Worker—10] DEBUG—Deleting format files that might be lingering over from previous unsuccessful runprematurely terminated—Products.txt.format.

2009-03-05 17:21:42,921-0800 [Pool Worker—10] DEBUG—No files found with search pattern Products.txt.format 2009-03-05 17:21:42,921-0800 [Pool Worker—10] DEBUG—Deleting tmp files that might be lingering over from previous unsuccessful runprematurely terminated—Products.txt.tmp.

2009-03-05 17:21:42,921-0800 [Pool Worker—10] DEBUG—No files found with search pattern Products.txt.tmp 2009-03-05 17:21:42,921-0800 [Pool Worker—10] INFO—Preprocessing source file Products.txt (c:\SMI\Data\389a3dee-ce29-4e42-90ad-44970093f745\data\Products.txt)

2009-03-05 17:21:42,921-0800 [Pool Worker—10] INFO—Read 20 lines, wrote 20 lines 2009-03-05 17:21:42,921-0800 [Pool Worker—10] INFO—Successfully preprocessed source file Products.txt 2009-03-05 17:21:42,968-0800 [Pool Worker—10] DEBUG—CREATE TABLES_N389a3dee_ce29_4e42_90ad_44970093f745.ST Products ([Product_ID$] Integer,[Category_ID$] Integer, [Product_Name$] NVarchar(10),[Category_Name$] NVarchar(9),[Unit_Price$] FLOAT,[DW_DM_PRODUCTS_PRODUCTS_CKSUM$] INTEGER)

2009-03-05 17:21:42,984-0800 [Pool Worker—10] INFO—Bulk loading staging table ST_Products from source file Products.txt 2009-03-05 17:21:42,984-0800 [Pool Worker—10] DEBUG—BULK INSERTS_N389a3 dee_ce29_4e42_90ad_44970093 f745.ST Products FROM 'c:\SMI \Data \389a3 dee-ce29-4e42-90ad-44970093f745\data\Products.txt.tmp' WITH (FORMATFILE='c:\SMI \Data \389a3 dee-ce29-4e42-90ad-44970093 f745 data\Products.txt.format',FIRSTROW=1,ROWS_PER_BATCH=20,DATAFILE TYPE='widechar')

2009-03-05 17:21:42,984-0800 [Pool Worker—10] INFO—Successfully loaded ST_Products 2009-03-05 17:21:42,984-0800 [Pool Worker—10] DEBUG—Logging step LoadStaging [ACORN: ST_Shopping_Carts] for 1, status Running 2009-03-05 17:21:42,984-0800 [Pool Worker—10] INFO—Starting LoadStaging [ACORN: ST_Shopping_Carts]

2009-03-05 17:21:42,984-0800 [Pool Worker—10] DEBUG—Deleting format files that might be lingering over from previous unsuccessful runprematurely terminated—Shopping_Carts.txt.format.

2009-03-05 17:21:42,984-0800 [Pool Worker—10] DEBUG—No files found with search pattern Shopping_Carts.txt.format 2009-03-05 17:21:42,984-0800 [Pool Worker—10] DEBUG—Deleting tmp files that might be lingering over from previous unsuccessful runprematurely terminated—Shopping Carts.txt.tmp.

2009-03-05 17:21:42,984-0800 [Pool Worker—10] DEBUG—No files found with search pattern Shopping_Carts.txt.tmp 2009-03-05 17:21:42,984-0800 [Pool Worker—10] INFO—Preprocessing source file Shopping_Carts.txt (c:\SMI\Data\389a3dee-ce29-4e42-90ad-44970093f745\data\Shopping Carts.txt)

2009-03-05 17:21:43,312-0800 [Pool Worker—10] INFO—Read 3000 lines, wrote 3000 lines 2009-03-05 17:21:43,312-0800 [Pool Worker—10] INFO—Successfully preprocessed source file Shopping_Carts.txt 2009-03-05 17:21:43,343-0800 [Pool Worker—10] DEBUG—CREATE TABLES_N389a3dee_ce29_4e42_90ad_44970093f745.ST_Shopping_Carts ([Cart_ID$] Integer,[Store_ID$] Integer,[Loyalty_Card_ID$] Integer,[Sales_Date$] DateTime, [Sales_Date_Day_ID$] INTEGER,[DW_DM_CART_DETAILS_SHOPPING_CARTS_CKSUM$] INTEGER, [DW_DM_CUSTOMERS_CUSTOMERS_CKSUM$] INTEGER,[DW_DM_STORES_STORES CKSUM$] INTEGER)

2009-03-05 17:21:43,375-0800 [Pool Worker—10] INFO—Bulk loading staging table ST_Shopping_Carts from source file Shopping_Carts.txt 2009-03-05 17:21:43,375-0800 [Pool Worker—10] DEBUG—BULK INSERTS_N389a3dee_ce29_4e42_90ad_44970093f745. ST_Shopping_Carts FROM 'c:\SMI\Data\389a3dee-ce29-4e42-90ad-44970093f745\data\ Shopping_Carts.txt.tmp' WITH (FORMATFILE='c:\SMI\Data\389a3dee-ce29-4e42-90ad-44970093f745\data\ Shopping Carts.txt.format', FIRSTROW=1,ROWS_PER_BATCH=3000, DATAFILETYPE='widechar')

2009-03-05 17:21:43,406-0800 [Pool Worker—10] INFO—Successfully loaded ST_Shopping_Carts 2009-03-05 17:21:43,406-0800 [Pool Worker—10] DEBUG—Logging step LoadStaging [ACORN: ST_Stores] for 1, status Running 2009-03-05 17:21:43,406-0800 [Pool Worker—10] INFO—Starting LoadStaging [ACORN: ST_Stores]

2009-03-05 17:21:43,406-0800 [Pool Worker—10] DEBUG—Deleting format files that might be lingering over from previous unsuccessful runprematurely terminated—Stores.txt.format.

2009-03-05 17:21:43,406-0800 [Pool Worker—10] DEBUG—No files found with search pattern Stores.txt.format 2009-03-05 17:21:43,406-0800 [Pool Worker—10] DEBUG—Deleting tmp files that might be lingering over from previous unsuccessful runprematurely terminated—Stores.txt.tmp.

2009-03-05 17:21:43,406-0800 [Pool Worker—10] DEBUG—No files found with search pattern Stores.txt.tmp 2009-03-05 17:21:43,406-0800 [Pool Worker—10] INFO—Preprocessing source file Stores.txt (c:\SMI\Data\389a3dee-ce29-4e42-90ad-44970093f745\data\Stores.txt)

2009-03-05 17:21:43,421-0800 [Pool Worker—10] INFO—Read 100 lines, wrote 100 lines 2009-03-05 17:21:43,421-0800 [Pool Worker—10] INFO—Successfully preprocessed source file Stores.txt 2009-03-05 17:21:43,453-0800 [Pool Worker—10] DEBUG—CREATE TABLES_N389a3dee_ce29_4e42_90ad_44970093f745. ST_Stores ([Store_ID$] Integer,[Region$] NVarchar(5), [City$] NVarchar(15),[Type$] NVarchar(11),[DW_DM_STORES_STORES CKSUM$] INTEGER)

2009-03-05 17:21:43,468-0800 [Pool Worker—10] INFO—Bulk loading staging table ST_Stores from source file Stores.txt 2009-03-05 17:21:43,468-0800 [Pool Worker—10] DEBUG—BULK INSERTS_N389a3dee_ce29_4e42_90ad_44970093f745. ST_Stores FROM 'c:\SMI\Data\389a3dee-ce29-4e42-90ad-44970093f745\data\Stores.txt.tmp' WITH (FORMATFILE='c:\SMI\Data\389a3dee-ce29-4e42-90ad-44970093f745\data\Stores.txt.format',FIRSTROW=1, ROWS_PER_BATCH=100,DATAFILETYPE='widechar')

2009-03-05 17:21:43,468-0800 [Pool Worker—10] INFO—Successfully loaded ST_Stores 2009-03-05 17:21:43,500-0800 [Pool Worker—10] INFO—Replacing unknown keys in ST_Cart_Details 2009-03-05 17:21:43,531-0800 [Pool Worker—10] INFO—Replacing unknown keys in ST_Customers 2009-03-05 17:21:43,546-0800 [Pool Worker—10] INFO—Replacing unknown keys in ST_Products
2009-03-05 17:21:43,562-0800 [Pool Worker—10] INFO—Replacing unknown keys in ST_Shopping_Carts
2009-03-05 17:21:43,578-0800 [Pool Worker—10] INFO—Replacing unknown keys in ST_Stores
2009-03-05 17:21:43,828-0800 [Pool Worker—10] INFO—Updating checksums
2009-03-05 17:21:43,828-0800 [Pool Worker—10] DEBUG— UPDATES_N389a3dee_ce29_4e42_90ad_44970093f745.ST_Cart_Details SET DW_DM_CART_DETAILS_SHOPPING_CARTS_ CKSUM$=BINARY_CHECKSUM(Cart_ID$),DW_DM_PRODUCTS_PRODUCTS_CKSUM$= BINARY_CHECKSUM(Product_ID$),DW_DM_CART_DETAILS_CART_DETAILS_ CKSUM$=BINARY_CHECKSUM(Cart_ID$,Product_ID$,Quantity$)
2009-03-05 17:21:43,875-0800 [Pool Worker—10] INFO—Updated 12438 rows
2009-03-05 17:21:43,875-0800 [Pool Worker—10] DEBUG—Logging step LoadStaging [ACORN: ST_Cart_Details] for 1, status Complete
2009-03-05 17:21:43,875-0800 [Pool Worker—10] INFO—Finished LoadStaging [ACORN: ST_Cart_Details]
2009-03-05 17:21:43,921-0800 [Pool Worker—10] INFO—Updating checksums
2009-03-05 17:21:43,921-0800 [Pool Worker—10] DEBUG— UPDATES_N389a3dee_ce29_4e42_90ad_44970093f745.ST_Customers SET DW_DM_CUSTOMERS_CUSTOMERS_CKSUM$= BINARY_CHECKSUM(Loyalty_Card_ID$,Age_Group$,Gender$)
2009-03-05 17:21:43,953-0800 [Pool Worker—10] INFO—Updated 100 rows
2009-03-05 17:21:43,953-0800 [Pool Worker—10] DEBUG—Logging step LoadStaging [ACORN: ST_Customers] for 1, status Complete
2009-03-05 17:21:43,968-0800 [Pool Worker—10] INFO—Finished LoadStaging [ACORN: ST_Customers]
2009-03-05 17:21:44,000-0800 [Pool Worker—10] INFO—Updating checksums
2009-03-05 17:21:44,015-0800 [Pool Worker—10] DEBUG— UPDATES_N389a3dee_ce29_4e42_90ad_44970093f745.ST_Products SET DW_DM_PRODUCTS_PRODUCTS_CKSUM$= BINARY_CHECKSUM(Product ID$,Category_ID$,Product_Name$,Category_Name$)
2009-03-05 17:21:44,015-0800 [Pool Worker—10] INFO—Updated 20 rows
2009-03-05 17:21:44,015-0800 [Pool Worker—10] DEBUG—Logging step LoadStaging [ACORN: ST_Products] for 1, status Complete
2009-03-05 17:21:44,031-0800 [Pool Worker—10] INFO—Finished LoadStaging [ACORN: ST_Products]
2009-03-05 17:21:44,062-0800 [Pool Worker—10] INFO—Updating checksums
2009-03-05 17:21:44,062-0800 [Pool Worker—10] DEBUG— UPDATES_N389a3dee_ce29_4e42_90ad_44970093f745.ST_Shopping_Carts SET DW_DM_CART_DETAILS_SHOPPING_CARTS_ CKSUM$=BINARY_CHECKSUM(Cart_I D$, Store_ID$, Loyalty_Card_ID$,Sales_Date$),DW_DM_CUSTOMERS_CUSTOMERS CKSUM$=BINARY_CHECKSUM(Loyalty_Card_ID$), DW_DM_STORES_STORES_CKSUM$=BINARY_CHECKSUM(Store_ID$)
2009-03-05 17:21:44,093-0800 [Pool Worker—10] INFO—Updated 3000 rows
2009-03-05 17:21:44,093-0800 [Pool Worker—10] DEBUG—Logging step LoadStaging [ACORN: ST_Shopping_Carts] for 1, status Complete
2009-03-05 17:21:44,125-0800 [Pool Worker—10] INFO—Finished LoadStaging [ACORN: ST_Shopping_Carts]
2009-03-05 17:21:44,171-0800 [Pool Worker—10] INFO—Updating checksums
2009-03-05 17:21:44,171-0800 [Pool Worker—10] DEBUG— UPDATES_N389a3dee_ce29_4e42_90ad_44970093f745.ST_Stores SET DW_DM_STORES_STORES_CKSUM$=BINARY_CHECKSUM(Store_ID$,Region$,City$,Type$)
2009-03-05 17:21:44,671-0800 [Pool Worker—10] INFO—Updated 100 rows
2009-03-05 17:21:44,671-0800 [Pool Worker—10] DEBUG—Logging step LoadStaging [ACORN: ST_Stores] for 1, status Complete
2009-03-05 17:21:44,671-0800 [Pool Worker—10] INFO—Finished LoadStaging [ACORN: ST_Stores]
2009-03-05 17:21:44,671-0800 [Pool Worker—10] DEBUG—Logging step LoadStaging [ACORN] for 1, status Complete
2009-03-05 17:21:44,687-0800 [Pool Worker—10] INFO—Finished LoadStaging [ACORN]
2009-03-05 17:21:44,687-0800 [Pool Worker—10] INFO—Elapsed Time=0 minutes, 2 seconds for: LoadStaging c:\SMI\Data\389a3dee-ce29-4e42-90ad-44970093f745\data 1 loadgroup=ACORN databasepath= c:\SMI\Data\389a3dee-ce29-4e42-90ad-44970093f745\data numrows=−1
2009-03-05 17:21:44,687-0800 [Pool Worker—10] INFO—Starting: LoadWarehouse 1 loadgroup=ACORN
2009-03-05 17:21:44,687-0800 [Pool Worker—10] DEBUG—Logging step LoadWarehouse [ACORN] for 1, status Running
2009-03-05 17:21:45,031-0800 [Pool Worker—10] INFO—Starting LoadWarehouse [ACORN]
2009-03-05 17:21:45,031-0800 [Pool Worker—10] DEBUG—SELECT COUNT(*) FROM S_N389a3dee_ce29_4e42_90ad_44970093f745.ST_Cart_Details
2009-03-05 17:21:45,031-0800 [Pool Worker—10] DEBUG—SELECT COUNT(*) FROM S_N389a3dee_ce29_4e42_90ad_44970093f745.ST_Customers
2009-03-05 17:21:45,031-0800 [Pool Worker—10] DEBUG—SELECT COUNT(*) FROM S_N389a3dee_ce29_4e42_90ad_44970093f745.ST_Products
2009-03-05 17:21:45,031-0800 [Pool Worker—10] DEBUG—SELECT COUNT(*) FROM S_N389a3dee_ce29_4e42_90ad_44970093f745.ST_Shopping_Carts
2009-03-05 17:21:45,046-0800 [Pool Worker—10] DEBUG—SELECT COUNT(*) FROM S_N389a3dee_ce29_4e42_90ad_44970093f745.ST_Stores
2009-03-05 17:21:45,046-0800 [Pool Worker—10] DEBUG—Order of loading dimension tables: [Cart_Details Shopping_Carts, Cart_Details Cart_Details, Customers Customers, Products Products, Stores Stores]
2009-03-05 17:21:45,046-0800 [Pool Worker—10] DEBUG—Logging step LoadWarehouse [ACORN: Cart_Details Shopping_Carts] for 1, status Running 2009-03-05 17:21:45,046-0800 [Pool Worker—10] INFO—Starting LoadWarehouse [ACORN: Cart_Details Shopping_Carts]

2009-03-05 17:21:45,046-0800 [Pool Worker—10] INFO—Probing staging table ST_Cart_Details for DISTINCT to load Cart_Details Shopping_Carts 2009-03-05 17:21:45,046-0800 [Pool Worker—10] DEBUG—
SELECT TOP 1 Cart_ID$,COUNT(*)
FROM
S_N389a3dee_ce29_4e42_90ad_44970093f745.ST_Cart_Details B
GROUP BY Cart_ID$
HAVING COUNT(*)>1

2009-03-05 17:21:45,406-0800 [Pool Worker—10] INFO—Not distinct 2009-03-05 17:21:45,406-0800 [Pool Worker—10] INFO—Inserting new records into table Cart_Details Shopping_Carts from staging table ST_Cart_Details 2009-03-05 17:21:45,406-0800 [Pool Worker—10] DEBUG—INSERT
INTO
S_N389a3dee_ce29_4e42_90ad_44970093f745.DW_DM_CART_DETAILS_SHOPPING_CARTS (Cart_ID$, ST_Shopping_Carts_CKSUM$,LOAD_ID,ST_Cart_Details_CKSUM$)
SELECT B.Cart_ID$,0,1, MAX(B.DW_DM_CART_DETAILS_SHOPPING_CARTS_CKSUM$)
FROM
S_N389a3dee_ce29_4e42_90ad_44970093f745.ST_Cart_Details B
WHERE NOT EXISTS
(SELECT *
FROM S_N389a3dee_ce29_4e42_90ad_44970093f745.DW_DM_CART_DETAILS_SHOPPING_CARTS C
WHERE C.Cart_ID$=B.Cart_ID$)
GROUP BY B.Cart_ID$ 2009-03-05 17:21:45,453-0800 [Pool Worker—10] INFO—[INSERTDT:1:Cart_Details Shopping_Carts: ST_Cart_Details:2976:[Cart_ID]] 2976 rows inserted 2009-03-05 17:21:45,453-0800 [Pool Worker—10] INFO—Updating surrogate keys for load id 1 in dimension table Cart_Details Shopping_Carts 2009-03-05 17:21:45,453-0800 [Pool Worker—10] INFO—Probing staging table ST_Shopping_Carts for DISTINCT to load Cart_Details Shopping_Carts 2009-03-05 17:21:45,453-0800 [Pool Worker—10] DEBUG—
SELECT TOP 1 Cart_ID$,COUNT(*)
FROM
S_N389a3dee_ce29_4e42_90ad_44970093f745.ST_Shopping_Carts B
GROUP BY Cart_ID$
HAVING COUNT(*)>1

2009-03-05 17:21:45,562-0800 [Pool Worker—10] DEBUG—CREATE INDEX DX_DW_DM_CART_DETAILS_SHOPPING_CART_SCART_DETAILSDCART_IDCART_DETAILSDST_SHOPPING_CARTS_CKSUM ON S_N389a3dee_ce29_4e42_90ad_44970093f745.DW_DM_CART_DETAILS_SHOPPING_CARTS (Cart_ID$, ST_Shopping_Carts_CKSUM$)

2009-03-05 17:21:45,828-0800 [Pool Worker—10] DEBUG—CREATE INDEX DX_ST_Shopping Carts-CART_DETAILSDCART_IDCART_DETAILSDDW_DM_CART_DETAILS_SHOPPING_CARTS_CKSUM ON S_N389a3dee_ce29_4e42_90ad_44970093f745.ST_Shopping_Carts (Cart ID$,DW_DM_CART_DETAILS_SHOPPING_CARTS_CKSUM$)

2009-03-05 17:21:46,031-0800 [Pool Worker—10] INFO—Inserting new records into table Cart_Details Shopping_Carts from staging table ST_Shopping_Carts 2009-03-05 17:21:46,031-0800 [Pool Worker—10] DEBUG—INSERT
INTO
S_N389a3dee_ce29_4e42_90ad_44970093f745.DW_DM_CART_DETAILS_SHOPPING_CARTS (Cart_ID$, Store_ID$,Loyalty_Card_ID$,Sales_Date$,ST_Cart_Details_CKSUM$,LOAD_ID,ST_Shopping_Carts_CKSUM$)
SELECT B.Cart_ID$,B.Store_ID$,B.Loyalty_Card_ID$, B.Sales_Date$,0,1, B.DW_DM_CART_DETAILS_SHOPPING_CARTS_CKSUM$
FROM
S_N389a3dee_ce29_4e42_90ad_44970093f745.ST_Shopping_Carts B
WHERE NOT EXISTS
(SELECT *
FROM S_N389a3dee_ce29_4e42_90ad_44970093f745.DW_DM_CART_DETAILS_SHOPPING_CARTS C
WHERE C.Cart_ID$=B.Cart_ID$)

2009-03-05 17:21:46,046-0800 [Pool Worker—10] INFO—[INSERTDT:1:Cart_Details Shopping_Carts: ST_Shopping_Carts:24:[Sales Date, Loyalty Card ID, Cart ID, Store ID]] 24 rows inserted 2009-03-05 17:21:46,046-0800 [Pool Worker—10] INFO—Updating table DW_DM_CART_DETAILS_SHOPPING_CARTS from staging table ST_Shopping_Carts 2009-03-05 17:21:46,046-0800 [Pool Worker—10] DEBUG—
UPDATES_N389a3dee_ce29_4e42_90ad_44970093f745.DW_DM_CART_DETAILS_SHOPPING_CARTS SET LOAD_ID=1,Store_ID$=B.Store_ID$, Loyalty_Card_ID$=B.Loyalty_Card_ID$, Sales_Date$=B.Sales_Date$, ST_Shopping_Carts_CKSUM$=B.DW_DM_CART_DETAILS_SHOPPING_CARTS_CKSUM$
FROM
S_N389a3dee_ce29_4e42_90ad_44970093f745.DW_DM_CART_DETAILS_SHOPPING_CARTS A
INNER JOIN
S_N389a3dee_ce29_4e42_90ad_44970093f745.ST_Shopping_Carts B ON A.Cart_ID$=B.Cart_ID$ AND A.ST_Shopping_Carts_CKSUM$< >B.DW_DM_CART_DETAILS_SHOPPING_CARTS_CKSUM$ 2009-03-05 17:21:46,250-0800 [Pool Worker—10] INFO—[UPDATEDT:1:Cart_Details Shopping_Carts: ST_Shopping_Carts:2976:[Sales Date, Loyalty Card ID, Store ID]] 2976 rows affected 2009-03-05 17:21:46,250-0800 [Pool Worker—10] INFO—Updating surrogate keys for load id 1 in dimension table Cart_Details Shopping_Carts 2009-03-05 17:21:46,250-0800 [Pool Worker—10] DEBUG—CREATE INDEX DX_DW_DM_CART_DETAILS_SHOPPING_CARTSCART_DETAILSDSHOPPING_CARTS_13875573 ON S_N389a3dee_ce29_4e42_90ad_44970093f745.DW_DM_CART_DETAILS_SHOPPING_CARTS (Shopping_Carts_13875573$)

2009-03-05 17:21:46,328-0800 [Pool Worker—10] DEBUG—CREATE INDEX DX_DW_DM_CART_DETAILS_SHOPPING_CARTSCART_DETAILSDCART_ID ON S_N389a3dee_ce29_4e42_90ad_44970093f745.DW_

DM_CART_DETAILS_SHOPPING_CARTS (Cart_ID$) INCLUDE (Shopping_Carts_13875573$)

2009-03-05 17:21:46,406-0800 [Pool Worker—10] DEBUG—Logging step LoadWarehouse [ACORN: Cart_Details Shopping_Carts] for 1, status Complete 2009-03-05 17:21:46,437-0800 [Pool Worker—10] INFO—Finished LoadWarehouse [ACORN: Cart_Details Shopping_Carts]

2009-03-05 17:21:46,437-0800 [Pool Worker—10] DEBUG—Logging step LoadWarehouse [ACORN: Cart_Details Cart_Details] for 1, status Running 2009-03-05 17:21:46,484-0800 [Pool Worker—10] INFO—Starting LoadWarehouse [ACORN: Cart_Details Cart_Details]

2009-03-05 17:21:46,484-0800 [Pool Worker—10] INFO—Probing staging table ST_Cart_Details for DISTINCT to load Cart_Details Cart_Details 2009-03-05 17:21:46,484-0800 [Pool Worker—10] DEBUG—
SELECT TOP 1 Cart_ID$,Product_ID$,COUNT(*)
FROM
S_N389a3dee_ce29_4e42_90ad_44970093f745.ST_
Cart_Details B
  GROUP BY Cart_ID$,Product_ID$
  HAVING COUNT(*)>1

2009-03-05 17:21:46,546-0800 [Pool Worker—10] DEBUG—CREATE INDEX DX_DW_DM_CART_DETAILS_CART_DETAILSCART_DETAILSDCART_ID-CART_DETAILSDPRODUCT_IDCART_
DETAILSDST_CART_DETAILS_CKSUM
ON S_N389a3dee_ce29_4e42_90ad_44970093f745.DW_
DM_CART_DETAILS_CART_DETAILS (Cart_ID$,Product ID$,ST_Cart_Details_CKSUM$)

2009-03-05 17:21:46,578-0800 [Pool Worker—10] DEBUG—CREATE INDEX DX_ST_Cart Details CART_DETAILSDCART_IDCART_DETAILSDPRO-DUCT_IDCART_DETAILSDDW_DM_CART_
DETAILS_CART_DETAILS_CKSUM ON
S_N389a3dee_ce29_4e42_90ad_44970093f745.ST_
Cart_Details (Cart_ID$,Product ID$,DW_DM_CART_DETAILS_CART_DETAILS_CKSUM$)

2009-03-05 17:21:46,781-0800 [Pool Worker—10] INFO—Inserting new records into table Cart_Details Cart_Details from staging table ST_Cart_Details 2009-03-05 17:21:46,781-0800 [Pool Worker—10] DEBUG—INSERT
INTO
S_N389a3dee_ce29_4e42_90ad_44970093f745.DW_
DM_CART_DETAILS_CART_DETAILS (Cart_ID$,Product_ID$, Quantity$,LOAD_ID,ST_Cart_Details_CKSUM$)
  SELECT B.Cart_ID$,B.Product_ID$,B.Quantity$,1, B.DW_DM_CART_DETAILS_CART_DETAILS_CKSUM$
  FROM
S_N389a3dee_ce29_4e42_90ad_44970093f745.ST_
Cart_Details B
  WHERE NOT EXISTS
  (SELECT *
    FROM S_N389a3dee_ce29_4e42_90ad_44970093f745.
      DW_DM_CART_DETAILS_CART_DETAILS C
    WHERE C.Cart_ID$=B.Cart_ID$ AND C.Product_ID$=B.Product_ID$)

2009-03-05 17:21:46,984-0800 [Pool Worker—10] INFO—[INSERTDT:1:Cart_Details Cart_Details:ST_Cart_Details:12438:[Quantity, Cart_ID, Product ID]] 12438 rows inserted 2009-03-05 17:21:46,984-0800 [Pool Worker—10] INFO—Updating surrogate keys for load id 1 in dimension table Cart_Details Cart_Details 2009-03-05 17:21:46,984-0800 [Pool Worker—10] DEBUG—
UPDATES_N389a3dee_ce29_4e42_90ad_44970093f745.
DW_DM_CART_DETAILS_CART_DETAILS SET
Shopping_Carts_13875573$=S_N389a3dee_ce29_4e42_
90ad_44970093f745.DW_DM_CART_DETAILS_
SHOPPING_CARTS.Shopping_Carts_13875573$
FROM
S_N389a3dee_ce29_4e42_90ad_44970093f745.DW_
DM_CART_DETAILS_CART_DETAILS
  INNER JOIN
S_N389a3dee_ce29_4e42_90ad_44970093f745.DW_
DM_CART_DETAILS_SHOPPING_CARTS ON
DW_DM_CART_DETAILS_CART_DETAILS.Cart_
ID$=S_N389a3dee_ce29_4e42_90ad_449
70093f745.DW_DM_CART_DETAILS_SHOPPING_
CARTS.Cart_ID$
  WHERE
S_N389a3dee_ce29_4e42_90ad_44970093f745.DW_
DM_CART_DETAILS_CART_DETAILS.LOAD_ID=1

2009-03-05 17:21:47,156-0800 [Pool Worker—10] INFO—12438 rows updated 2009-03-05 17:21:47,156-0800 [Pool Worker—10] WARN—Unable to load dimension table [Cart_Details Cart_Details] from staging table [ST_Shopping_Carts]: could not find columns in staging table that map to any dimension columns except for any potential references to natural keys 2009-03-05 17:21:47,156-0800 [Pool Worker—10] DEBUG—CREATE INDEX DX_DW_DM_CART_DETAILS_CART_DETAILSCART_DETAILSDCART_DE-TAILS2003 51043 ON
S_N389a3dee_ce29_4e42_90ad_44970093f745.DW_
DM_CART_DETAILS_CART_DETAILS (Cart_Details200351043$) INCLUDE (Shopping_Carts_13875573$)

2009-03-05 17:21:47,265-0800 [Pool Worker—10] DEBUG—CREATE INDEX DX_DW_DM_CART_DETAILS_CART_DETAILSCART_DETAILSDCART_ID-CART_DETAILSDPRODUCT_ID ON
S_N389a3dee_ce29_4e42_90ad_44970093f745.DW_
DM_CART_DETAILS_CART_DETAILS (Cart_ID$,Product_ID$) INCLUDE (Cart_Details200351043$,Shopping_Carts_13875573$)

2009-03-05 17:21:47,421-0800 [Pool Worker—10] DEBUG—CREATE INDEX DX_DW_DM_CART_DETAILS_CART_DETAILSCART_DETAILSDCART_ID
ON S_N389a3dee_ce29_4e42_90ad_44970093f745.DW_
DM_CART_DETAILS_CART_DETAILS (Cart_ID$) INCLUDE (Cart_Details200351043 $, Shopping_Carts_13875573$)

2009-03-05 17:21:47,515-0800 [Pool Worker—10] DEBUG—Logging step LoadWarehouse [ACORN: Cart_Details Cart_Details] for 1, status Complete 2009-03-05 17:21:47,531-0800 [Pool Worker—10] INFO—Finished LoadWarehouse [ACORN: Cart_Details Cart_Details]

2009-03-05 17:21:47,531-0800 [Pool Worker—10] DEBUG—Logging step LoadWarehouse [ACORN: Customers Customers] for 1, status Running 2009-03-05 17:21:47,546-0800 [Pool Worker—10] INFO—Starting LoadWarehouse [ACORN: Customers Customers]

2009-03-05 17:21:47,546-0800 [Pool Worker—10] WARN—Unable to load dimension table [Customers Customers] from staging table [ST_Cart_Details]: natural keys not available at level Customers 2009-03-05 17:21:47,546-0800 [Pool Worker—10] INFO—Probing staging table ST_Shopping_Carts for DISTINCT to load Customers Customers 2009-03-05 17:21:47,546-0800 [Pool Worker—10] DEBUG—
SELECT TOP 1 Loyalty_Card_ID$,COUNT(*)
FROM
S_N389a3dee_ce29_4e42_90ad_44970093f745.ST_Shopping_Carts B
GROUP BY Loyalty_Card_ID$
HAVING COUNT(*)>1

2009-03-05 17:21:47,593-0800 [Pool Worker—10] INFO—Not distinct 2009-03-05 17:21:47,593-0800 [Pool Worker—10] INFO—Inserting new records into table Customers Customers from staging table ST_Shopping_Carts 2009-03-05 17:21:47,593-0800 [Pool Worker—10] DEBUG—INSERT
INTO
S_N389a3dee_ce29_4e42_90ad_44970093f745.DW_DM_CUSTOMERS_CUSTOMERS (Loyalty_Card_ID$, ST_Customers_CKSUM$,LOAD_ID,ST_Shopping_Carts_CKSUM$)
SELECT B.Loyalty_Card_ID$,0,1, MAX(B.DW_DM_CUSTOMERS_CUSTOMERS_CKSUM$)
FROM
S_N389a3dee_ce29_4e42_90ad_44970093f745.ST_Shopping_Carts B
WHERE NOT EXISTS
(SELECT *
FROM S_N389a3dee_ce29_4e42_90ad_44970093f745.
    DW_DM_CUSTOMERS_CUSTOMERS C
WHERE C.Loyalty_Card_ID$=B.Loyalty_Card_ID$)
GROUP BY B.Loyalty_Card_ID$ 2009-03-05 17:21:47,625-0800 [Pool Worker—10] INFO—[INSERTDT:1:Customers Customers: ST_Shopping_Carts:100:[Loyalty Card ID]] 100 rows inserted 2009-03-05 17:21:47,625-0800 [Pool Worker—10] INFO—Updating surrogate keys for load id 1 in dimension table Customers Customers 2009-03-05 17:21:47,625-0800 [Pool Worker—10] INFO—Probing staging table ST_Customers for DISTINCT to load Customers Customers 2009-03-05 17:21:47,625-0800 [Pool Worker—10] DEBUG—
SELECT TOP 1 Loyalty_Card_ID$,COUNT(*)
FROM
S_N389a3dee_ce29_4e42_90ad_44970093f745.ST_Customers B
GROUP BY Loyalty_Card_ID$
HAVING COUNT(*)>1

2009-03-05 17:21:47,625-0800 [Pool Worker—10] DEBUG—CREATE INDEX DX_ST_CustomersCUSTOMERSDLOYALTY_CARD_IDCUSTOMERSDDW_DM_CUSTOMERS_CUSTOMERS_CKSUM ON S_N389a3dee_ce29_4e42_90ad_44970093f745.ST_Customers (Loyalty_Card_ID$,DW_DM_CUSTOMERS_CUSTOMERS_CKSUM$)

2009-03-05 17:21:47,640-0800 [Pool Worker—10] INFO—Inserting new records into table Customers Customers from staging table ST_Customers 2009-03-05 17:21:47,640-0800 [Pool Worker—10] DEBUG—INSERT
INTO
S_N389a3dee_ce29_4e42_90ad_44970093f745.DW_DM_CUSTOMERS_CUSTOMERS (Loyalty_Card_ID$, Age_Group$,Gender$,ST_Shopping_Carts_CKSUM$, LOAD_ID,ST_Customers_CKSUM$)
SELECT B.Loyalty_Card_ID$,B.Age_Group$,B.Gender$,0,1, B.DW_DM_CUSTOMERS_CUSTOMERS_CKSUM$
FROM
S_N389a3dee_ce29_4e42_90ad_44970093f745.ST_Customers B
WHERE NOT EXISTS
(SELECT *
FROM S_N389a3dee_ce29_4e42_90ad_44970093f745.
    DW_DM_CUSTOMERS_CUSTOMERS C
WHERE C.Loyalty_Card_ID$=B.Loyalty_Card_ID$)

2009-03-05 17:21:47,656-0800 [Pool Worker—10] INFO—[INSERTDT:1:Customers Customers:ST_Customers:0:[Loyalty_Card_ID, Age_Group, Gender]] 0 rows inserted 2009-03-05 17:21:47,656-0800 [Pool Worker—10] INFO—Updating table DW_DM_CUSTOMERS_CUSTOMERS from staging table ST_Customers 2009-03-05 17:21:47,656-0800 [Pool Worker—10] DEBUG—
UPDATES_N389a3dee_ce29_4e42_90ad_44970093f745.
DW_DM_CUSTOMERS_CUSTOMERS SET LOAD_ID=1,Age_Group$=B.Age_Group$, Gender$=B.Gender$,ST_Customers_CKSUM$=B.DW_DM_CUSTOMERS_CUSTOMERS_CKSUM$
FROM
S_N389a3dee_ce29_4e42_90ad_44970093f745.DW_DM_CUSTOMERS_CUSTOMERS A
INNER JOIN
S_N389a3dee_ce29_4e42_90ad_44970093f745.ST_Customers B ON
A.Loyalty_Card_ID$=B.Loyalty_Card_ID$ AND A.ST_Customers_CKSUM$< >B.DW_CUSTOMERS_CUSTOMERS_CKSUM$ 2009-03-05 17:21:47,703-0800 [Pool Worker—10] INFO—[UPDATEDT:1:Customers Customers:ST_Customers:100:[Age_Group, Gender]] 100 rows affected 2009-03-05 17:21:47,703-0800 [Pool Worker—10] INFO—Updating surrogate keys for load id 1 in dimension table Customers Customers 2009-03-05 17:21:47,703-0800 [Pool Worker—10] DEBUG—CREATE INDEX DX_DW_DM_CUSTOMERS_CUSTOMERSCUSTOMERSDCUSTOMERS120094747 ON
S_N389a3dee_ce29_4e42_90ad_44970093f745.DW_M_CUSTOMERS_CUSTOMERS (Customers120094747$)

2009-03-05 17:21:47,734-0800 [Pool Worker—10] DEBUG—Logging step LoadWarehouse [ACORN: Customers Customers] for 1, status Complete 2009-03-05 17:21:47,734-0800 [Pool Worker—10] INFO—Finished LoadWarehouse [ACORN: Customers Customers]

2009-03-05 17:21:47,734-0800 [Pool Worker—10] DEBUG—Logging step LoadWarehouse [ACORN: Products Products] for 1, status Running 2009-03-05 17:21:47,734-0800 [Pool Worker—10] INFO—Starting LoadWarehouse [ACORN: Products Products]

2009-03-05 17:21:47,734-0800 [Pool Worker—10] INFO—Probing staging table ST_Cart_Details for DISTINCT to load Products Products
2009-03-05 17:21:47,734-0800 [Pool Worker—10] DEBUG—
SELECT TOP 1 Product_ID$,COUNT(*)
FROM
S_N389a3dee_ce29_4e42_90ad_44970093f745.ST_Cart_Details B
GROUP BY Product_ID$
HAVING COUNT(*)>1
2009-03-05 17:21:47,750-0800 [Pool Worker—10] INFO—Not distinct
2009-03-05 17:21:47,750-0800 [Pool Worker—10] INFO—Inserting new records into table Products Products from staging table ST_Cart_Details
2009-03-05 17:21:47,750-0800 [Pool Worker—10] DEBUG—INSERT
INTO
S_N389a3dee_ce29_4e42_90ad_44970093f745.DW_DM_PRODUCTS_PRODUCTS (Product_IDS,ST_Products CKSUM$,LOAD_ID,ST_Cart_Details_CKSUM$)
SELECT B.Product_ID$,0,1, MAX(B.DW_DM_PRODUCTS_PRODUCTS_CKSUM$)
FROM
S_N389a3dee_ce29_4e42_90ad_44970093f745.ST_Cart_Details B
WHERE NOT EXISTS
(SELECT *
FROM S_N389a3dee_ce29_4e42_90ad_44970093f745.DW_DM_PRODUCTS_PRODUCTS C
WHERE C.Product_IDS=B.Product_ID$)
GROUP BY B.Product_ID$
2009-03-05 17:21:47,765-0800 [Pool Worker—10] INFO—[INSERTDT:1:Products Products:ST_Cart_Details: 20:[Product ID]] 20 rows inserted
2009-03-05 17:21:47,765-0800 [Pool Worker—10] INFO—Updating surrogate keys for load id 1 in dimension table Products Products
2009-03-05 17:21:47,765-0800 [Pool Worker—10] INFO—Probing staging table ST_Products for DISTINCT to load Products Products
2009-03-05 17:21:47,765-0800 [Pool Worker—10] DEBUG—
SELECT TOP 1 Product_ID$,COUNT(*)
FROM
S_N389a3dee_ce29_4e42_90ad_44970093f745.ST_Products B
GROUP BY Product_ID$
HAVING COUNT(*)>1
2009-03-05 17:21:47,843-0800 [Pool Worker—10] DEBUG—CREATE INDEX DX_ST_ProductsPRODUCTSDPRODUCT_IDPRODUCTSDDW_DM_PRODUCTS_PRODUCTS_CKSUM ON S_N389a3dee_ce29_4e42_90ad_44970093f745.ST_Products (Product_ID$,DW_DM_PRODUCTS_PRODUCTS_CKSUM$)
2009-03-05 17:21:47,890-0800 [Pool Worker—10] INFO—Inserting new records into table Products Products from staging table ST_Products
2009-03-05 17:21:47,890-0800 [Pool Worker—10] DEBUG—INSERT
INTO
S_N389a3dee_ce29_4e42_90ad_44970093f745.DW_DM_PRODUCTS_PRODUCTS (Product_ID$,Category_ID$,Product_Name$,Category_Name$,ST_Cart_Details_CKSUM$,LOAD_ID,ST_Products_CKSUM$)
SELECT B.Product_ID$,B.Category_ID$,B.Product_Name$,B.Category_Name$,0,1, B.DW_DM_PRODUCTS_PRODUCTS_CKSUM$
FROM
S_N389a3dee_ce29_4e42_90ad_44970093f745.ST_Products B
WHERE NOT EXISTS
(SELECT *
FROM S_N389a3dee_ce29_4e42_90ad_44970093f745.DW_DM_PRODUCTS_PRODUCTS C
WHERE C.Product_ID$=B.Product_ID$)
2009-03-05 17:21:47,890-0800 [Pool Worker—10] INFO—[INSERTDT:1:Products Products:ST_Products:0: [Product Name, Category ID, Category Name, Product ID]] 0 rows inserted
2009-03-05 17:21:47,890-0800 [Pool Worker—10] INFO—Updating table DW_DM_PRODUCTS_PRODUCTS from staging table ST_Products
2009-03-05 17:21:47,890-0800 [Pool Worker—10] DEBUG—
UPDATES_N389a3dee_ce29_4e42_90ad_44970093f745.DW_DM_PRODUCTS_PRODUCTS SET LOAD_ID=1, Category_ID$=B.Category IDS,Product NameS=B.Product_Name$,
Category_Name$=B.Category_Name$,
ST_Products_CKSUM$=B.DW_DM_PRODUCTS_PRODUCTS_CK SUM$
FROM S_N389a3dee_ce29_4e42_90ad_44970093f745.DW_DM_PRODUCTS_PRODUCTS A
INNER JOIN S_N389a3dee_ce29_4e42_90ad_44970093f745.ST_Products B ON A.Product_ID$=B.Product_ID$ AND A.ST_Products CKSUM$< >B.DW_DM_PRODUCTS_PRODUCTS_CKSUM$
2009-03-05 17:21:47,906-0800 [Pool Worker—10] INFO—[UPDATEDT:1:Products Products: ST_Products: 20:[Product Name, Category ID, Category Name]] 20 rows affected
2009-03-05 17:21:47,906-0800 [Pool Worker—10] INFO—Updating surrogate keys for load id 1 in dimension table Products Products
2009-03-05 17:21:47,906-0800 [Pool Worker—10] DEBUG—CREATE INDEX DX_DW_DM_PRODUCTS_PRODUCTSPRODUCTSDPRODUCTS1249892458 ON S_N389a3dee_ce29_4e42_90ad_44970093f745.DW_DM_PRODUCTS_PRODUCTS (Products1249892458$)
2009-03-05 17:21:47,937-0800 [Pool Worker—10] DEBUG—Logging step LoadWarehouse [ACORN: Products Products] for 1, status Complete
2009-03-05 17:21:47,937-0800 [Pool Worker—10] INFO—Finished LoadWarehouse [ACORN: Products Products]
2009-03-05 17:21:47,937-0800 [Pool Worker—10] DEBUG—Logging step LoadWarehouse [ACORN: Stores Stores] for 1, status Running
2009-03-05 17:21:47,937-0800 [Pool Worker—10] INFO—Starting LoadWarehouse [ACORN: Stores Stores]
2009-03-05 17:21:47,937-0800 [Pool Worker—10] WARN—Unable to load dimension table [Stores Stores] from staging table [ST_Cart_Details]: natural keys not available at level Stores 2009-03-05 17:21:47,937-0800 [Pool Worker—10] INFO—Probing staging table ST_Shopping_Carts for DISTINCT to load Stores Stores 2009-03-05 17:21:47,937-0800 [Pool Worker—10] DEBUG—
SELECT TOP 1 Store_ID$,COUNT(*)
FROM S_N389a3dee_ce29_4e42_90ad_44970093f745.ST_Shopping_Carts B
GROUP BY Store_ID$
HAVING COUNT(*)>1

2009-03-05 17:21:47,937-0800 [Pool Worker—10] INFO—Not distinct 2009-03-05 17:21:47,937-0800 [Pool Worker—10] INFO—Inserting new records into table Stores Stores from staging table ST_Shopping_Carts 2009-03-05 17:21:47,937-0800 [Pool Worker—10] DEBUG—INSERT
INTO S_N389a3dee_ce29_4e42_90ad_44970093f745.DW_DM_STORES_STORES (Store_ID$,ST_Stores_CKSUM$, LOAD_ID,ST_Shopping_Carts_CKSUM$)
SELECT B.Store_ID$,0,1, MAX(B.DW_DM_STORES_STORES_CKSUM$)
FROM S_N389a3dee_ce29_4e42_90ad_44970093f745.ST_Shopping_Carts B
WHERE NOT EXISTS
(SELECT *
FROM S_N389a3dee_ce29_4e42_90ad_44970093f745.DW_DM_STORES_STORES C
WHERE C.Store_ID$=B.Store_ID$)
GROUP BY B.Store_ID$ 2009-03-05 17:21:47,984-0800 [Pool Worker—10] INFO—[INSERTDT:1:Stores Stores: ST_Shopping_Carts: 100:[Store ID]] 100 rows inserted 2009-03-05 17:21:47,984-0800 [Pool Worker—10] INFO—Updating surrogate keys for load id 1 in dimension table Stores Stores 2009-03-05 17:21:47,984-0800 [Pool Worker—10] INFO—Probing staging table ST_Stores for DISTINCT to load Stores Stores 2009-03-05 17:21:47,984-0800 [Pool Worker—10] DEBUG—
SELECT TOP 1 Store_ID$,COUNT(*)
FROM S_N389a3dee_ce29_4e42_90ad_44970093f745.ST_Stores B
GROUP BY Store_ID$
HAVING COUNT(*)>1

2009-03-05 17:21:48,015-0800 [Pool Worker—10] DEBUG—CREATE INDEX DX_ST_StoresSTORESDSTORE_IDSTORESDDW_DM_STORES_STORES_CKSUM ON S_N389a3dee_ce29_4e42_90ad_44970093f745.ST_Stores (Store_ID$,DW_DM_STORES_STORES_CKSUM$)

2009-03-05 17:21:48,031-0800 [Pool Worker—10] INFO—Inserting new records into table Stores Stores from staging table ST_Stores 2009-03-05 17:21:48,031-0800 [Pool Worker—10] DEBUG—INSERT
INTO S_N389a3dee_ce29_4e42_90ad_44970093f745.DW_DM_STORES_STORES (Store_ID$,Region$,City$,Type$, ST_Shopping_Carts_CKSUM$,LOAD_ID,ST_Stores_CKSUM$)
SELECT B.Store_ID$,B.Region$,B.City$,B.Type$,0,1, B.DW_DM_STORES_STORES_CKSUM$
FROM S_N389a3dee_ce29_4e42_90ad_44970093f745.ST_Stores B
WHERE NOT EXISTS
(SELECT *
FROM S_N389a3dee_ce29_4e42_90ad_44970093f745.DW_DM_STORES_STORES C
WHERE C.Store_ID$=B.Store_ID$)

2009-03-05 17:21:48,046-0800 [Pool Worker—10] INFO—[INSERTDT:1:Stores Stores:ST_Stores:0:[Region, Type, Store ID, City]] 0 rows inserted 2009-03-05 17:21:48,046-0800 [Pool Worker—10] INFO—Updating table DW_DM_STORES_STORES from staging table ST_Stores 2009-03-05 17:21:48,046-0800 [Pool Worker—10] DEBUG—
UPDATES_N389a3dee_ce29_4e42_90ad_44970093f745.DW_DM_STORES_STORES SET LOAD_ID=1, Region$=B.Region$,City$=B.City$,Type$=B.Type$, ST_Stores_CKSUM$=B.DW_DM_STORES_STORES_CKSUM$
FROM S_N389a3dee_ce29_4e42_90ad_44970093f745.DW_DM_STORES_STORES A
INNER JOIN S_N389a3dee_ce29_4e42_90ad_44970093f745.ST_Stores B ON A. Store_ID$=B.Store_ID$ AND A.ST_Stores_CKSUM$<>B.DW_DM_STORES_STORES_CKSUM$ 2009-03-05 17:21:48,093-0800 [Pool Worker—10] INFO—[UPDATEDT:1:Stores Stores: ST_Stores:100:[Region, Type, City]] 100 rows affected 2009-03-05 17:21:48,093-0800 [Pool Worker—10] INFO—Updating surrogate keys for load id 1 in dimension table Stores Stores 2009-03-05 17:21:48,093-0800 [Pool Worker—10] DEBUG—CREATE INDEX DX_DW_DM_STORES_STORESSTORESDSTORES1543357431 ON S_N389a3dee_ce29_4e42_90ad_44970093f745.DW_DM_STORES_STORES (Stores1543357431$)

2009-03-05 17:21:48,140-0800 [Pool Worker—10] DEBUG—Logging step LoadWarehouse [ACORN: Stores Stores] for 1, status Complete 2009-03-05 17:21:48,140-0800 [Pool Worker—10] INFO—Finished LoadWarehouse [ACORN: Stores Stores]

2009-03-05 17:21:48,140-0800 [Pool Worker—10] DEBUG—Logging step LoadWarehouse [ACORN: Cart_Details Day Products Customers Stores Fact] for 1, status Running 2009-03-05 17:21:48,140-0800 [Pool Worker—10] INFO—Starting LoadWarehouse [ACORN: Cart_Details Day Products Customers Stores Fact]

2009-03-05 17:21:48,140-0800 [Pool Worker—10] INFO—Deleting any records from table Cart_Details Day Products Customers Stores Fact with same load ID 2009-03-05 17:21:48,140-0800 [Pool Worker—10] DEBUG—DELETE
FROM S_N389a3dee_ce29_4e42_90ad_44970093f745.DW_SF_CART_DETAILS_DAY_PRODUCTS_CUSTOMERS_STORES
WHERE LOAD_ID=1

2009-03-05 17:21:48,156-0800 [Pool Worker—10] INFO—0 rows deleted 2009-03-05 17:21:48,156-0800 [Pool Worker—10] INFO—Inserting new records into table Cart_Details Day Products Customers Stores Fact from staging table ST_Cart_Details 2009-03-05 17:21:48,156-0800 [Pool Worker—10] DEBUG—INSERT INTO S_N389a3dee_ce29_4e42_90ad_44970093f745.DW_SF_CART_DETAILS_DAY_PRODUCTS_CUSTOMERS_STORES (DW_SF_CART_DETAILS_DAY_PRODUCTS_CUSTOMERS_STORES.Cart_Details$Cart_ID$,DW_SF_CART_DETAILS_DAY_PRODUCTS_CUSTOMERS_STORES.Cart_Details$Product_ID$,DW_SF_CART_DETAILS_DAY_PRODUCTS_CUSTOMERS_STORES.Products$Product_ID$,DW_SF_CART_DETAILS_DAY_PRODUCTS_CUSTOMERS_STORES.Time$ Day_ID$,DW_SF_CART_DETAILS_DAY_PRODUCTS_CUSTOMERS_STORES.Cart_ID$, DW_SF_CART_DETAILS_DAY_PRODUCTS_CUSTOMERS_STORES.Product_ID$,DW_SF_CART_DETAILS_DAY_PRODUCTS_CUSTOMERS_STORES.Quantity$,DW_SF_CART_DETAILS_DAY_PRODUCTS_CUSTOMERS_STORES.Cart_Details$ Shopping_Carts_13875573$, DW_SF_CART_DETAILS_DAY_PRODUCTS_CUSTOMERS_STORES.Cart_Details$Cart_Details200351043$, DW_SF_CART_DETAILS_DAY_PRODUCTS_CUSTOMERS_STORES.Products$Products1249892458$, DW_SF_CART_DETAILS_DAY_PRODUCTS_CUSTOMERS_STORES.Time$ Week_ID$,Time$Month_ID$,Time$Quarter_ID$, DW_SF_CART_DETAILS_DAY_PRODUCTS_CUSTOMERS_STORES.Stores$Stores1543357431$, DW_SF_CART_DETAILS_DAY_PRODUCTS_CUSTOMERS_STORES.Customers$Customers120094747$, Stores$Store_ID$,Time$Sales_Date_Day_ID$, Customers$Loyalty_Card_ID$, LOAD_ID)
SELECT B.Cart_ID$,B.Product_ID$,B.Product_ID$, 39870,B.Cart_ID$,B.Product_ID$,B.Quantity$, S_N389a3dee_ce29_4e42_90ad_44970093f745.DW_DM_CART_DETAILS_SHOPPING_CARTS. Shopping_Carts_13875573$, S_N389a3dee_ce29_4e42_90ad_44970093f745.DW_DM_CART_DETAILS_CART_DETAILS.Cart_Details200351043$,S_N389a3dee_ce29_4e42_90ad_44970093f745.DW_DM_PRODUCTS_PRODUCTS.Products 1249892458$,dbo.DW_DM_TIME_DAY.Week_ID$, dbo.DW_DM_TIME_DAY.Month_ID$,dbo.DW_DM_TIME_DAY.Quarter_ID$,SN389a3_dee_ce29_4e42_90ad_44970093f745.DW_DM_STORES_STORES.Stores1543357431$, S_N389a3dee_ce29_4e42_90ad_44970093f745.DW_DM_CUSTOMERS_CUSTOMERS.Customers120094747$,ST_Shopping_Carts$.Store_ID$,ST_Shopping_Carts$.Sales_Date_Day_ID$,ST_Shopping_Carts$.Loyalty_Card_ID$,1
FROM S_N389a3dee_ce29_4e42_90ad_44970093f745.ST_Cart_Details B
LEFT OUTER JOIN S_N389a3dee_ce29_4e42_90ad_44970093f745.ST_Shopping_Carts ST_Shopping_Carts$ ON B.Cart_ID$=ST_Shopping_Carts$.Cart_ID$
INNER JOIN S_N389a3dee_ce29_4e42_90ad_44970093f745.DW_DM_CART_DETAILS_SHOPPING_CARTS ON B.Cart_ID$=S_N389a3dee_ce29_4e42_90ad_44970093f745.DW_DM_CART_DETAILS_SHOPPING_CARTS.Cart_ID$
INNER JOIN S_N389a3dee_ce29_4e42_90ad_44970093f745.DW_DM_CART_DETAILS_CART_DETAILS ON B.Cart_ID$=S_N389a3dee_ce29_4e42_90ad_44970093f745.DW_DM_CART_DETAILS_CART_DETAILS.Cart_ID$ AND B.Product_ID$=S_N389a3dee_ce29_4e42_90ad_44970093f745.DW_DM_CART_DETAILS_CART_DETAILS.Product_ID$
INNER JOIN S_N389a3dee_ce29_4e42_90ad_44970093f745.DW_DM_PRODUCTS_PRODUCTS ON B.Product_ID$=S_N389a3dee_ce29_4e42_90ad_44970093f745.DW_DM_PRODUCTS_PRODUCTS.Product_ID$
INNER JOIN dbo.DW_DM_TIME_DAY ON 39870=dbo.DW_DM_TIME_DAY.Day_ID$
INNER JOIN S_N389a3dee_ce29_4e42_90ad_44970093f745.DW_DM_STORES_STORES ON ST_Shopping_Carts$.Store_ID$=S_N389a3dee_ce29_4e42_90ad_44970093f745.DW_DM_STORES_STORES.Store_ID$
INNER JOIN S_N389a3dee_ce29_4e42_90ad_44970093f745.DW_DM_CUSTOMERS_CUSTOMERS ON ST_Shopping_Carts$.Loyalty_Card_ID$=S_N389a3dee_ce29_4e42_90ad_44970093f745.DW_DM_CUSTOMERS_CUSTOMERS.Loyalty_Card_ID$
2009-03-05 17:21:48,343-0800 [Pool Worker—10] INFO—[INSERTF:1:Cart_Details Day Products Customers Stores Fact:ST_Cart_Details:12438:[Quantity, Cart ID, Product ID]] 12438 rows inserted
2009-03-05 17:21:48,343-0800 [Pool Worker—10] DEBUG—CREATE INDEX MX_DW_SF_CART_DETAILS_DAY_PRODUCTS_CUSTOMERS_STORES-CUSTOMERS DCUSTOMERS120094747 ON S_N389a3dee_ce29_4e42_90ad_44970093f745.DW_SF_CART_DETAILS_DAY_PRODUCTS_CUSTOMERS_STORES (Customers$Customers120094747$)
2009-03-05 17:21:48,421-0800 [Pool Worker—10] DEBUG—CREATE INDEX MX_DW_SF_CART_DETAILS_DAY_PRODUCTS_CUSTOMERS_STORES-PRODUCTSDPRODUCTS1249892458 ON S_N389a3dee_ce29_4e42_90ad_44970093f745.DW_SF_CART_DETAILS_DAY_PRODUCTS_CUSTOMERS_STORES (Products$Products1249892458$)
2009-03-05 17:21:48,453-0800 [Pool Worker—10] DEBUG—CREATE INDEX MX_DW_SF_CART_DETAILS_DAY_PRODUCTS_CUSTOMERS_STORES-TIMEDDAY_ID ON S_N389a3dee_ce29_4e42_90ad_44970093f745.DW_SF_CART_DETAILS_DAY_PRODUCTS_CUSTOMERS_STORES (Time$Day_ID$)
2009-03-05 17:21:48,468-0800 [Pool Worker—10] DEBUG—CREATE INDEX MX_DW_SF_CART_DETAILS_DAY_PRODUCTS_CUSTOMERS_STORES-TIMEDWEEK_ID ON S_N389a3dee_ce29_4e42_90ad_44970093f745.DW_SF_CART_DETAILS_DAY_PRODUCTS_CUSTOMERS_STORES (Time$Week_ID$)
2009-03-05 17:21:48,515-0800 [Pool Worker—10] DEBUG—CREATE INDEX MX_DW_SF_CART_DETAILS_DAY_PRODUCTS_CUSTOMERS_STORES-TIMEDMONTH_ID ON S_N389a3dee_ce29_4e42_90ad_44970093f745.DW_SF_CART_DETAILS_DAY_PRODUCTS_CUSTOMERS_STORES (Time$Month_ID$)

2009-03-05 17:21:48,546-0800 [Pool Worker—10] DEBUG—CREATE INDEX MX_DW_SF_CART_DETAILS_DAY_PRODUCTS_CUSTOMERS_STORES-TIMEDQUARTER_ID ON S_N389a3dee_ce29_4e42_90ad_44970093f745.DW_SF_CART_DETAILS_DAY_PRODUCTS_CUSTOMERS_STORES (Time$Quarter_ID$)

2009-03-05 17:21:48,562-0800 [Pool Worker—10] DEBUG—CREATE INDEX MX_DW_SF_CART_DETAILS_DAY_PRODUCTS_CUSTOMERS_STORES-STORESDSTORES1543357431 ON S_N389a3dee_ce29_4e42_90ad_44970093f745.DW_SF_CART_DETAILS_DAY_PRODUCTS_CUSTOMERS_STORES (Stores$Stores1543357431$)

2009-03-05 17:21:48,609-0800 [Pool Worker—10] DEBUG—CREATE INDEX MX_DW_SF_CART_DETAILS_DAY_PRODUCTS_CUSTOMERS_STORES-CART_DETAILSDCART_DETAILS200351043 ON S_N389a3dee_ce29_4e42_90ad_44970093f745.DW_SF_CART_DETAILS_DAY_PRODUCTS_CUSTOMERS_STORES (Cart_Details$Cart_Details200351043$)

2009-03-05 17:21:48,656-0800 [Pool Worker—10] DEBUG—CREATE INDEX MX_DW_SF_CART_DETAILS_DAY_PRODUCTS_CUSTOMERS_STORES-CART_DETAILSDSHOPPING_CARTS_13875573 ON S_N389a3dee_ce29_4e42_90ad_44970093f745.DW_SF_CART_DETAILS_DAY_PRODUCTS_CUSTOMERS_STORES (Cart_Details$Shopping_Carts_13875573$)

2009-03-05 17:21:48,671-0800 [Pool Worker—10] DEBUG—CREATE INDEX DX_DW_SF_CART_DETAILS_DAY_PRODUCTS_CUSTOMERS_STORES-LOAD_ID ON S_N389a3dee_ce29_4e42_90ad_44970093f745.DW_SF_CART_DETAILS_DAY_PRODUCTS_CUSTOMERS_STORES (LOAD_ID)

2009-03-05 17:21:48,734-0800 [Pool Worker—10] DEBUG—Logging step LoadWarehouse [ACORN: Cart_Details Day Products Customers Stores Fact] for 1, status Complete 2009-03-05 17:21:48,734-0800 [Pool Worker—10] INFO—Finished LoadWarehouse [ACORN: Cart_Details Day Products Customers Stores Fact]

2009-03-05 17:21:48,734-0800 [Pool Worker—10] DEBUG—Logging step LoadWarehouse [ACORN: Shopping_Carts Day Customers Stores Fact] for 1, status Running 2009-03-05 17:21:48,734-0800 [Pool Worker—10] INFO—Starting LoadWarehouse [ACORN: Shopping_Carts Day Customers Stores Fact]

2009-03-05 17:21:48,734-0800 [Pool Worker—10] INFO—Deleting any records from table Shopping_Carts Day Customers Stores Fact with same load ID 2009-03-05 17:21:48,734-0800 [Pool Worker—10] DEBUG—DELETE FROM S_N389a3dee_ce29_4e42_90ad_44970093f745.DW_SF_SHOPPING_CARTS_DAY_CUSTOMERS_STORES WHERE LOAD_ID=1

2009-03-05 17:21:48,750-0800 [Pool Worker—10] INFO—0 rows deleted 2009-03-05 17:21:48,750-0800 [Pool Worker—10] INFO—Inserting new records into table Shopping_Carts Day Customers Stores Fact from staging table ST_Shopping_Carts 2009-03-05 17:21:48,750-0800 [Pool Worker—10] DEBUG—INSERT INTO S_N389a3dee_ce29_4e42_90ad_44970093f745.DW_SF_SHOPPING_CARTS_DAY_CUSTOMERS_STORES (DW_SF_SHOPPING_CARTS_DAY_CUSTOMERS_STORES.Cart_Details$Cart_ID$, DW_SF_SHOPPING_CARTS_DAY_CUSTOMERS_STORES.Customers$Loyalty_Card_ID$, DW_SF_SHOPPING_CARTS_DAY_CUSTOMERS_STORES.Stores$Store_ID$, DW_SF_SHOPPING_CARTS_DAY_CUSTOMERS_STORES.Time$Day_ID$,DW_SF_SHOPPING_CARTS_DAY_CUSTOMERS_STORES.Cart_ID$, DW_SF_SHOPPING_CARTS_DAY_CUSTOMERS_STORES.Loyalty_Card_ID$, DW_SF_SHOPPING_CARTS_DAY_CUSTOMERS_ST ORES.Store_ID$,DW_SF_SHOPPING_CARTS_DAY_CUSTOMERS_STORES.Time$Sales_Date_Day_ID$,DW_SF_SHOPPING_CARTS_DAY_CUSTOMERS_STORES.Cart_Details$ Shopping_Carts_13875573$,DW_SF_SHOPPING_CARTS_DAY_CUSTOMERS_STORES.Time$Week_ID$,Time$Month_ID$,Time$Quarter_ID$,DW_SF_SHOPPING_CARTS_DAY_CUSTOMERS_STORES.Stores$Stores1543357431$, DW_SF_SHOPPING_CARTS_DAY_CUSTOMERS_STORES.Customers$Customers120094747$, LOAD_ID) SELECT B.Cart_ID$,B.Loyalty_Card_ID$,B.Store_ID$, 39870,B.Cart_ID$,B.Loyalty_Card_ID$,B.Store_ID$, B.Sales_Date_Day_ID$, S_N389a3dee_ce29_4e42_90ad_44970093f745.DW_DM_CART_DETAILS_SHOPPING_CARTS.Shopping_Carts_13875573$,dbo.DW_DM_TIME_DAY.Week_ID$,dbo.DW_DM_TIME_DAY.Month_ID$, dbo.DW_DM_TIME_DAY.Quarter_IID$,S_N389a3dee_ce29_4e42_90ad_44970093f745.DW_DM_STORES_STORES.Stores1543357431$, S_N389a3_dee_ce29_4e42_90ad_44970093f745.DW_DM_CUSTOMERS_CUSTOMERS.Customers120094747$,1 FROM S_N389a3dee_ce29_4e42_90ad_44970093f745.ST_Shopping_Carts B
INNER JOIN S_N389a3dee_ce29_4e42_90ad_44970093f745.DW_DM_CART_DETAILS_SHOPPING_CARTS ON B.Cart_ID$=S_N389a3dee_ce29_4e42_90ad_44970093f745.DW_DM_CART_DETAILS_SHOPPING_CARTS.Cart_ID$
INNER JOIN dbo.DW_DM_TIME_DAY ON 39870=dbo.DW_DM_TIME_DAY.Day_ID$
INNER JOIN S_N389a3dee_ce29_4e42_90ad_44970093f745.DW_DM_STORES_STORES ON B.Store_ID$=S_N389a3dee_ce29_4e42_90ad_44970093f745.DW_DM_STORES_STORES.Store_ID$
INNER JOIN S_N389a3dee_ce29_4e42_90ad_44970093f745.DW_DM_CUSTOMERS_CUSTOMERS ON B.Loyalty_Card_ID$=S_N389a3dee_ce29_4e42_90ad_44970093f745.DW_DM_CUSTOMERS_CUSTOMERS.Loyalty_Card_ID$ 2009-03-05 17:21:48,796-0800 [Pool Worker—10] INFO—[INSERTF:1:Shopping_Carts Day Customers Stores Fact: ST_Shopping_Carts:3000:[Loyalty Card ID, Cart ID, Store ID]] 3000 rows inserted 2009-03-05 17:21:48,796-0800 [Pool Worker—10] DEBUG—CREATE INDEX MX_DW_SF_SHOPPING_CARTS_DAY_CUSTOMERS_STORESCUSTOMERSDCUSTOMERS120094747 ON S_N389a3dee_ce29_4e42_90ad_44970093f745.DW_SF_SHOPPING_CARTS_DAY_CUSTOMERS_STORES (Customers$Customers120094747$)

2009-03-05 17:21:48,828-0800 [Pool Worker—10] DEBUG—CREATE INDEX MX_DW_SF_SHOPPING_CARTS_DAY_CUSTOMERS_STORESTIMEDDAY_ID ON S_N389a3dee_ce29_4e42_90ad_44970093f745.DW_SF_SHOPPING_CARTS_DAY_CUSTOMERS_STORES (Time$Day_ID$)

2009-03-05 17:21:48,843-0800 [Pool Worker—10] DEBUG—CREATE INDEX MX_DW_SF_SHOPPING_CARTS_DAY_CUSTOMERS_STORES-TIMEDWEEK_ID ON S_N389a3dee_ce29_4e42_90ad_44970093f745.DW_SF_SHOPPING_CARTS_DAY_CUSTOMERS_STORES (Time$Week_ID$)

2009-03-05 17:21:48,890-0800 [Pool Worker—10] DEBUG—CREATE INDEX MX_DW_SF_SHOPPING_CARTS_DAY_CUSTOMERS_STORESTIMEDMONTH_ID ON S_N389a3dee_ce29_4e42_90ad_44970093f745.DW_SF_SHOPPING_CARTS_DAY_CUSTOMERS_STORES (Time$Month_ID$)

2009-03-05 17:21:48,921-0800 [Pool Worker—10] DEBUG—CREATE INDEX MX_DW_SF_SHOPPING_CARTS_DAY_CUSTOMERS_STORESTIMEDQUARTER_ID ON S_N389a3dee_ce29_4e42_90ad_44970093f745.DW_SF_SHOPPING_CARTS_DAY_CUSTOMERS_STORES (Time$Quarter_ID$)

2009-03-05 17:21:48,921-0800 [Pool Worker—10] DEBUG—CREATE INDEX MX_DW_SF_SHOPPING_CARTS_DAY_CUSTOMERS_STORES-STORESDSTORES1543357431 ON S_N389a3dee_ce29_4e42_90ad_44970093f745.DW_SF_SHOPPING_CARTS_DAY_CUSTOMERS_STORES (Stores$Stores1543357431$)

2009-03-05 17:21:48,953-0800 [Pool Worker—10] DEBUG—CREATE INDEX MX_DW_SF_SHOPPING_CARTS_DAY_CUSTOMERS_STORESCART_DETAILSDSHOPPING_CARTS_13875573 ON S_N389a3dee_ce29_4e42_90ad_44970093f745.DW_SF_SHOPPING_CARTS_DAY_CUSTOMERS_STORES (Cart_Details$Shopping_Carts_13875573$)

2009-03-05 17:21:48,968-0800 [Pool Worker—10] DEBUG—CREATE INDEX DX_DW_SF_SHOPPING_CARTS_DAY_CUSTOMERS_STORESLOAD_ID ON S_N389a3dee_ce29_4e42_90ad_44970093f745.DW_SF_SHOPPING_CARTS_DAY_CUSTOMERS_STORES (LOAD_ID)

2009-03-05 17:21:48,984-0800 [Pool Worker—10] DEBUG—Logging step LoadWarehouse [ACORN: Shopping_Carts Day Customers Stores Fact] for 1, status Complete 2009-03-05 17:21:48,984-0800 [Pool Worker—10] INFO—Finished LoadWarehouse [ACORN: Shopping_Carts Day Customers Stores Fact]

2009-03-05 17:21:48,984-0800 [Pool Worker—10] DEBUG—Logging step LoadWarehouse [ACORN: Products Day Fact] for 1, status Running 2009-03-05 17:21:48,984-0800 [Pool Worker—10] INFO—Starting LoadWarehouse [ACORN: Products Day Fact]

2009-03-05 17:21:48,984-0800 [Pool Worker—10] INFO—Deleting any records from table Products Day Fact with same load ID 2009-03-05 17:21:48,984-0800 [Pool Worker—10] DEBUG—DELETE
FROM
S_N389a3dee_ce29_4e42_90ad_44970093f745.DW_SF_PRODUCTS_DAY
WHERE LOAD_ID=1

2009-03-05 17:21:48,984-0800 [Pool Worker—10] INFO—0 rows deleted 2009-03-05 17:21:48,984-0800 [Pool Worker—10] INFO—Inserting new records into table Products Day Fact from staging table ST_Products 2009-03-05 17:21:48,984-0800 [Pool Worker—10] DEBUG—INSERT
INTO S_N389a3dee_ce29_4e42_90ad_44970093f745.DW_SF_PRODUCTS_DAY (DW_SF_PRODUCTS_DAY.Products$Product_ID$,DW_SF_PRODUCTS_DAY.Time$Day_ID$,DW_SF_PRODUCTS_DAY.Product_ID$,DW_SF_PRODUCTS_DAY.Category_ID$,DW_SF_PRODUCTS_DAY.Unit_Price$,DW_SF_PRODUCTS_DAY.Products$Products 1249892458$,DW_SF_PRODUCTS_DAY.Time$Week_ID$,Time$Month_ID$,Time$Quarter_ID$,LOAD_ID)
SELECT B.Product_ID$,39870,B.Product_ID$,B.Category_ID$,B.Unit_Price$,
S_N389a3dee_ce29_4e4290ad_44970093f745.DW_DM_PRODUCTS_PRODUCTS.Products1249892458$,
dbo.DW_DM_TIME_DAY.Week_ID$,dbo.DW_DM_TIME_DAY.Month_ID$,dbo.DW_DM_TIME_DAY.Quarter_ID$,1
FROM
S_N389a3dee_ce29_4e42_90ad_44970093f745.ST_Products B
INNER JOIN
S_N389a3dee_ce29_4e42_90ad_44970093f745.DW_DM_PRODUCTS_PRODUCTS ON B.Product_ID$=S_N389a3dee_ce29_4e42_90ad_44970093f745.DW_DM_PRODUCTS_PRODUCTS.Product_ID$
INNER JOIN dbo.DW_DM_TIME_DAY ON 39870=dbo.DW_DM_TIME_DAY.Day_ID$ 2009-03-05 17:21:48,984-0800 [Pool Worker—10] INFO—[INSERTF:1:Products Day Fact:ST_Products:20:[Category_ID, Unit_Price, Product_ID]] 20 rows inserted 2009-03-05 17:21:49,000-0800 [Pool Worker—10] DEBUG—CREATE INDEX MX_DW_SF_PRODUCTS_DAYTIMEDDAY_ID_ON S_N389a3dee_ce29_4e42_90ad_44970093f745.DW_SF_PRODUCTS_DAY (Time$Day_ID$)

2009-03-05 17:21:49,015-0800 [Pool Worker—10] DEBUG—CREATE INDEX MX_DW_SF_PRODUCTS_DAYTIMEDWEEK_ID ON S_N389a3dee_ce29_4e42_90ad_44970093f745.DW_SF_PRODUCTS_DAY (Time$Week_ID$)

2009-03-05 17:21:49,015-0800 [Pool Worker—10] DEBUG—CREATE INDEX MX_DW_SF_PRODUCTS_DAYTIMEDMONTH_ID ON S_N389a3dee_ce29_4e42_90ad_44970093f745.DW_SF_PRODUCTS_DAY (Time$Month_ID$)

2009-03-05 17:21:49,031-0800 [Pool Worker—10] DEBUG—CREATE INDEX MX_DW_SF_

PRODUCTS_DAYTIMEDQUARTER_ID ON S_N389a3dee_ce29_4e42_90ad_44970093f745.DW_SF_PRODUCTS_DAY (Time$Quarter_ID$)

2009-03-05 17:21:49,031-0800 [Pool Worker—10] DEBUG—CREATE INDEX MX_DW_SF_PRODUCTS_DAYPRODUCTSDPRODUCTS1249892458 ON S_N389a3dee_ce29_4e42_90ad_44970093f745.DW_SF_PRODUCTS_DAY (Products$Products1249892458$)

2009-03-05 17:21:49,062-0800 [Pool Worker—10] DEBUG—CREATE INDEX DX_DW_SF_PRODUCTS_DAYLOAD_ID ON S_N389a3dee_ce29_4e42_90ad_44970093f745.DW_SF_PRODUCTS_DAY (LOAD_ID)

2009-03-05 17:21:49,062-0800 [Pool Worker—10] DEBUG—Logging step LoadWarehouse [ACORN: Products Day Fact] for 1, status Complete 2009-03-05 17:21:49,062-0800 [Pool Worker—10] INFO—Finished LoadWarehouse [ACORN: Products Day Fact]

2009-03-05 17:21:49,078-0800 [Pool Worker—10] DEBUG—Logging step LoadWarehouse [ACORN: Customers Day Fact] for 1, status Running 2009-03-05 17:21:49,078-0800 [Pool Worker—10] INFO—Starting LoadWarehouse [ACORN: Customers Day Fact]

2009-03-05 17:21:49,078-0800 [Pool Worker—10] INFO—Deleting any records from table Customers Day Fact with same load ID 2009-03-05 17:21:49,078-0800 [Pool Worker—10] DEBUG—DELETE
FROM
S_N389a3dee_ce29_4e42_90ad_44970093f745.DW_SF_CUSTOMERS_DAY
WHERE LOAD_ID=1

2009-03-05 17:21:49,093-0800 [Pool Worker—10] INFO—0 rows deleted 2009-03-05 17:21:49,093-0800 [Pool Worker—10] INFO—Inserting new records into table Customers Day Fact from staging table ST_Customers 2009-03-05 17:21:49,093-0800 [Pool Worker—10] DEBUG—INSERT
INTO
S_N389a3dee_ce29_4e42_90ad_44970093f745.DW_SF_CUSTOMERS_DAY (DW_SF_CUSTOMERS_DAY.Customers$Loyalty_Card_IID$,DW_SF_CUSTOMERS_DAY.Time$Day_ID$,DW_SF_CUSTOMERS_DAY.Loyalty_Card_ID$,DW_SF_CUSTOMERS_DAY.Time$Week_ID$,Time$Month_ID$,Time$Quarter_ID$,DW_SF_CUSTOMERS_DAY.Customers$Customers120094747$, LOAD_ID)
SELECT B.Loyalty_Card_ID$,39870,B.Loyalty_Card_ID$,dbo.DW_DM_TIME_DAY.Week_ID$, dbo.DW_DM_TIME_DAY.Month_ID$,dbo.DW_DM_TIME_DAY.Quarter_ID$,
S_N389a3dee_ce29_4e42_90ad_44970093f745.DW_DM_CUSTOMERS_CUSTOMERS.Customers120094747$,1
FROM
S_N389a3dee_ce29_4e42_90ad_44970093f745.ST_Customers B
INNER JOIN dbo.DW_DM_TIME_DAY ON 39870=dbo.DW_DM_TIME_DAY.Day_ID$
INNER JOIN
S_N389a3dee_ce29_4e42_90ad_44970093f745.DW_DM_CUSTOMERS_CUSTOMERS ON B.Loyalty_Card_ID$=S_N389a3dee_ce29_4e42_90ad_44970093f745.DW_DM_CUSTOMERS_CUSTOMERS.Loyalty_Card_ID$ 2009-03-05 17:21:49,093-0800 [Pool Worker—10] INFO—[INSERTF:1:Customers Day Fact:ST_Customers: 100:[Loyalty Card ID]] 100 rows inserted 2009-03-05 17:21:49,093-0800 [Pool Worker—10] DEBUG—CREATE INDEX MX_DW_SF_CUSTOMERS_DAYCUSTOMERSDCUSTOMERS120094747 ON S_N389a3dee_ce29_4e42_90ad_44970093f745.DW_SF_CUSTOMERS_DAY (Customers$Customers120094747$)

2009-03-05 17:21:49,140-0800 [Pool Worker—10] DEBUG—CREATE INDEX MX_DW_SF_CUSTOMERS_DAYTIMEDDAY_ID ON S_N389a3dee_ce29_4e42_90ad_44970093f745.DW_SF_CUSTOMERS_DAY (Time$Day_ID$)

2009-03-05 17:21:49,140-0800 [Pool Worker—10] DEBUG—CREATE INDEX MX_DW_SF_CUSTOMERS_DAYTIMEDWEEK_ID ON S_N389a3dee_ce29_4e42_90ad_44970093f745.DW_SF_CUSTOMERS_DAY (Time$Week_ID$)

2009-03-05 17:21:49,140-0800 [Pool Worker—10] DEBUG—CREATE INDEX MX_DW_SF_CUSTOMERS_DAYTIMEDMONTH_ID ON S_N389a3dee_ce29_4e42_90ad_44970093f745.DW_SF_CUSTOMERS_DAY (Time$Month_ID$)

2009-03-05 17:21:49,171-0800 [Pool Worker—10] DEBUG—CREATE INDEX MX_DW_SF_CUSTOMERS_DAYTIMEDQUARTER_ID ON S_N389a3dee_ce29_4e42_90ad_44970093f745.DW_SF_CUSTOMERS_DAY (Time$Quarter_ID$)

2009-03-05 17:21:49,187-0800 [Pool Worker—10] DEBUG—CREATE INDEX DX_DW_SF_CUSTOMERS_DAYLOAD_ID ON S_N389a3dee_ce29_4e42_90ad_44970093f745.DW_SF_CUSTOMERS_DAY (LOAD_ID)

2009-03-05 17:21:49,187-0800 [Pool Worker—10] DEBUG—Logging step LoadWarehouse [ACORN: Customers Day Fact] for 1, status Complete 2009-03-05 17:21:49,187-0800 [Pool Worker—10] INFO—Finished LoadWarehouse [ACORN: Customers Day Fact]

2009-03-05 17:21:49,187-0800 [Pool Worker—10] DEBUG—Logging step LoadWarehouse [ACORN: Stores Day Fact] for 1, status Running 2009-03-05 17:21:49,187-0800 [Pool Worker—10] INFO—Starting LoadWarehouse [ACORN: Stores Day Fact]

2009-03-05 17:21:49,187-0800 [Pool Worker—10] INFO—Deleting any records from table Stores Day Fact with same load ID 2009-03-05 17:21:49,187-0800 [Pool Worker—10] DEBUG—DELETE
FROM
S_N389a3dee_ce29_4e42_90ad_44970093f745.DW_SF_STORES_DAY
WHERE LOAD_ID=1

2009-03-05 17:21:49,187-0800 [Pool Worker—10] INFO—0 rows deleted 2009-03-05 17:21:49,187-0800 [Pool Worker—10] INFO—Inserting new records into table Stores Day Fact from staging table ST_Stores 2009-03-05 17:21:49,187-0800 [Pool Worker—10] DEBUG—INSERT
INTO
S_N389a3dee_ce29_4e42_90ad_44970093f745.DW_SF_STORES_DAY (DW_SF_STORES_DAY.Stores$Store_ID$,DW_SF_STORES_DAY.Time$Day_ID$DW_SF_STORES_DAY.Store_ID$,DW_SF_STORES_DAY.Time$Week_ID$,Time$Month_ID$,Time$Quarter_ID$,DW_SF_STORES_DAY.Stores-$Stores1543357431$, LOAD_ID)
    SELECT B.Store_ID$,39870,B.Store_ID$,dbo.DW_DM_TIME_DAY.Week_ID$,dbo.DW_DM_TIME_DAY.Month_ID$,dbo.DW_DM_TIME_DAY.Quarter_ID$,
S_N389a3dee_ce29_4e42_90ad_44970093f745.DW_DM_STORES_STORES.Stores1543357431$,1
    FROM
S_N389a3dee_ce29_4e42_90ad_44970093f745.ST_Stores B
    INNER JOIN dbo.DW_DM_TIME_DAY ON 39870=dbo.DW_DM_TIME_DAY.Day_ID$
    INNER JOIN
S_N389a3dee_ce29_4e42_90ad_44970093f745.DW_DM_STORES_STORES ON B.Store_ID$=S_N389a3dee_ce29_4e42_90ad_44970093f745.DW_DM_STORES_STORES.Store_ID$
    2009-03-05 17:21:49,203-0800 [Pool Worker—10] INFO—[INSERTF:1:Stores Day Fact: ST_Stores:100:[Store_ID]] 100 rows inserted
    2009-03-05 17:21:49,203-0800 [Pool Worker—10] DEBUG—CREATE INDEX MX_DW_SF_STORES_DAYTIMEDDAY_ID ON S_N389a3dee_ce29_4e42_90ad_44970093f745.DW_SF_STORES_DAY (Time$Day_ID$)
    2009-03-05 17:21:49,218-0800 [Pool Worker—10] DEBUG—CREATE INDEX MX_DW_SF_STORES_DAYTIMEDWEEK_ID ON S_N389a3dee_ce29_4e42_90ad_44970093f745.DW_SF_STORES_DAY (Time$Week_ID$)
    2009-03-05 17:21:49,234-0800 [Pool Worker—10] DEBUG—CREATE INDEX MX_DW_SF_STORES_DAYTIMEDMONTH_ID ON S_N389a3dee_ce29_4e42_90ad_44970093f745.DW_SF_STORES_DAY (Time$Month_ID$)
    2009-03-05 17:21:49,234-0800 [Pool Worker—10] DEBUG—CREATE INDEX MX_DW_SF_STORES_DAYTIMEDQUARTER_ID ON S_N389a3dee_ce29_4e42_90ad_44970093f745.DW_SF_STORES_DAY (Time$Quarter_ID$)
    2009-03-05 17:21:49,234-0800 [Pool Worker—10] DEBUG—CREATE INDEX MX_DW_SF_STORES_DAYSTORESDSTORES1543357431 ON S_N389a3dee_ce29_4e42_90ad_44970093f745.DW_SF_STORES_DAY (Stores$Stores1543357431$)
    2009-03-05 17:21:49,281-0800 [Pool Worker—10] DEBUG—CREATE INDEX DX_DW_SF_STORES_DAY-LOAD_ID ON S_N389a3dee_ce29_4e42_90ad_44970093f745.DW_SF_STORES_DAY (LOAD_ID)
    2009-03-05 17:21:49,312-0800 [Pool Worker—10] DEBUG—Logging step LoadWarehouse [ACORN: Stores Day Fact] for 1, status Complete
    2009-03-05 17:21:49,312-0800 [Pool Worker—10] INFO—Finished LoadWarehouse [ACORN: Stores Day Fact]
    2009-03-05 17:21:49,312-0800 [Pool Worker—10] DEBUG—Logging step LoadWarehouse [ACORN] for 1, status Complete
    2009-03-05 17:21:49,328-0800 [Pool Worker—10] INFO—Finished LoadWarehouse [ACORN]
    2009-03-05 17:21:49,328-0800 [Pool Worker—10] INFO—Elapsed Time=0 minutes, 4 seconds for: LoadWarehouse 1 loadgroup=ACORN
    2009-03-05 17:21:49,328-0800 [Pool Worker—10] INFO—Starting: ExecuteScriptGroup ACORN
    2009-03-05 17:21:49,328-0800 [Pool Worker—10] WARN—Empty script group: There are no scripts defined in script group ACORN
    2009-03-05 17:21:49,328-0800 [Pool Worker—10] INFO—Elapsed Time=0 minutes, 0 seconds for: ExecuteScriptGroup ACORN Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor configured to:
   receive source data;
   derive metadata from the received source data, where to derive the metadata the processor is configured to:
      determine for a table in the source data, a grain of the table, where the grain of the table defines what data records of the table represent and a set of levels associated with the data records of the table;
      determine for a column in the source data, a target dimension and level;
      determine whether the column is a measure; and
      determine one or more dimensional hierarchies, based on the determined grain of the table, where one or more levels of the one or more dimensional hierarchies are designated to be transformed into dimension tables;
   generate a database schema using the derived metadata, including generation of:
      a measure table for each grain, based upon the determination of which columns in the source data are measures, the measure table including metrics to be aggregated; and
      a dimension table based at least in part on the determination of the one or more dimensional hierarchies, and on an overview of all columns of the source data, wherein, each column having a grain in the target dimension and at or above a pre-determined level is a target, the dimension table being generated based on the target columns, where the dimension table includes a grouping of the metrics; and
a memory coupled to the processor and configured to provide the processor with instructions.

2. The system of claim 1, wherein:
the received source data includes a plurality of tables and a plurality of keys; and
the one or more processors are further configured to:
identify one or more keys in the source data and to identify one or more hierarchies for the keys; and
load a data warehouse associated with the generated database schema, where levels are loaded in descending order, and where, to load the data warehouse, the one or more processors are configured to:
generate one or more inserts into the at least one generated dimension table for each staging table that is a source, for use in moving data into the at least one dimension table;
join one or more additional staging tables to supply one or more related columns that are not in the at least one dimension table, as higher level keys, where higher level dimension tables serve as lookups for keys;

move data from one or more tables of the source data into the at least one generated dimension table at least in part by using the generated one or more inserts, where only changed data is moved due to a prior marking of source records during a prior system scanning of source tables; and identify one or more sources for the grain of the source data by scanning tables in the source data.

3. The system of claim 2, wherein the processor is further configured to generate metadata associated with the data loading procedures.

4. A method, comprising:

receiving source data; and deriving metadata from the received source data, where deriving the metadata includes the steps of:

determining, for a table in the source data, a grain of the table, where the grain of the table defines what data records of the table represent and a set of levels associated with the data records of the table;

determining, for a column in the source data, a target dimension and level;

determining whether the column is a measure;

determining one or more dimensional hierarchies, based on the determined grain of the table, where one or more levels of the one or more dimensional hierarchies are designated to be transformed into dimension tables; and generating a database schema using the derived metadata, including generation of:

a measure table for each grain, based upon the determination of which columns in the source data are measures, the measure table including metrics to be aggregated; and a dimension table based at least in part on the determination of the one or more dimensional hierarchies, and on an overview of all columns of the source data, wherein, each column having a grain in the target dimension and at or above a pre-determined level is a target, the dimension table being generated based on the target columns, where the dimension table includes a grouping of the metrics.

5. The method of claim 4 wherein the received source data includes a plurality of tables and a plurality of keys.

6. The method of claim 5 further comprising identifying one or more keys in the source data and to identify one or more hierarchies for the keys.

7. The method of claim 4, wherein:

the received source data includes a plurality of tables and a plurality of keys;

the method further comprises the step of identifying one or more keys in the source data and to identify one or more hierarchies for the keys;

a procedure for loading a data warehouse associated with the generated database schema, where levels are loaded in descending order, includes the steps of:

generating one or more inserts into the at least one generated dimension table for each staging table that is a source, for use in moving data into the at least one dimension table;

joining one or more additional staging tables to supply one or more related columns that are not in the at least one dimension table, as higher level keys, where higher level dimension tables serve as lookups for keys;

moving data from one or more tables of the source data into the at least one generated dimension table at least in part by using the generated one or more inserts, where only changed data is moved due to a prior marking of source records during a prior system scanning of source tables; and identifying one or more sources for the grain of the source data by scanning tables in the source data.

8. The method of claim 7 further comprising generating metadata associated with the data loading procedures.

9. A computer program product embodied in a non-transitory computer readable storage medium and comprising computer instructions for:

receiving source data; and deriving metadata from the received source data, where deriving the metadata includes the steps of:

determining, for a table in the source data, a grain of the table, where the grain of the table defines what data records of the table represent and a set of levels associated with the data records of the table;

determining, for a column in the source data, a target dimension and level;

determining whether the column is a measure;

determining one or more dimensional hierarchies, based on the determined grain of the table, where one or more levels of the one or more dimensional hierarchies are designated to be transformed into dimension tables; and generating a database schema using the derived metadata, including generation of:

a measure table for each grain, based upon the determination of which columns in the source data are measures, the measure table including metrics to be aggregated; and a dimension table based at least in part on the determination of the one or more dimensional hierarchies, and on an overview of all columns of the source data, wherein, each column having a grain in the target dimension and at or above a pre-determined level is a target, the dimension table being generated based on the target columns, where the dimension table includes a grouping of the metrics.

10. The computer program product of claim 9, wherein the received source data includes a plurality of tables and a plurality of keys.

11. The computer program product of claim 10, further comprising computer instructions for identifying one or more keys in the source data and to identify one or more hierarchies for the keys.

12. The computer program product of claim 9:

wherein the received source data includes a plurality of tables and a plurality of keys;

further comprising computer instructions for identifying one or more keys in the source data and to identify one or more hierarchies for the keys;

further comprising computer instructions for a procedure for loading a data warehouse associated with the generated database schema, where levels are loaded in descending order, comprising the steps of:

generating one or more inserts into the at least one generated dimension table for each staging table that is a source, for use in moving data into the at least one dimension table;

joining one or more additional staging tables to supply one or more related columns that are not in the at least one dimension table, as higher level keys, where higher level dimension tables serve as lookups for keys;

moving data from one or more tables of the source data into the at least one generated dimension table at least in part by using the generated one or more inserts, where only changed data is moved due to a prior marking of source records during a prior system scanning of source tables; and identifying one or more sources for the grain of the source data by scanning tables in the source data.

13. The computer program product of claim 12, further comprising computer instructions for generating metadata associated with the data loading procedures.

14. The system of claim 1, where, upon receipt of a selection of a hierarchy level, the one or more processors are further configured to determine a table format necessary to generate the dimension table for the selected hierarchy level.

15. The system of claim 14, wherein the one or more processors are further configured to load a data warehouse associated with the generated database schema, where levels are loaded in descending order, and where, to load the data warehouse, the one or more processors are configured to:

generate one or more inserts into the at least one generated dimension table for use in moving data therein;

move data from one or more tables in the source data into the at least one generated dimension table at least in part by using the generated one or more inserts, where only changed data is moved; and identify one or more sources for the grain of the source data by scanning tables in the source data.

16. The system of claim 2, wherein the one or more processors are further configured to:

if the at least one generated dimension table is a type where only current versions of each dimension record are kept, perform an update for any non-inserted dimensional records that may have changed attributes; and if the at least one generated dimension table is a type where history is kept, flag as retired any dimension records that have changed, and use the inserts to add new records with changed attributes.

17. The system of claim 16, wherein the one or more processors are further configured to:

scan source tables to locate sources for all measure grains;

in a case of snapshots, truncate old records;

in a case of inserts, look up higher level surrogate keys from the dimension tables; and transform natural keys, which may be composed of multiple columns, into simple integer surrogate keys for performance.

* * * * *